US010558000B2

(12) United States Patent
Miller et al.

(10) Patent No.: US 10,558,000 B2
(45) Date of Patent: Feb. 11, 2020

(54) COMMUNICATION SYSTEM HAVING COAXIAL CONNECTOR MODULE AND FIBER OPTIC MODULE

(71) Applicant: TE CONNECTIVITY CORPORATION, Berwyn, PA (US)

(72) Inventors: Keith Edwin Miller, Manheim, PA (US); David James Fabian, Mount Joy, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/977,098

(22) Filed: May 11, 2018

(65) Prior Publication Data

US 2019/0227245 A1 Jul. 25, 2019

Related U.S. Application Data

(60) Provisional application No. 62/620,207, filed on Jan. 22, 2018.

(51) Int. Cl.
*G02B 6/38* (2006.01)
*H01R 13/74* (2006.01)
(Continued)

(52) U.S. Cl.
CPC ......... *G02B 6/3897* (2013.01); *G02B 6/3806* (2013.01); *G02B 6/3817* (2013.01);
(Continued)

(58) Field of Classification Search
USPC ..................................................... 385/88–89
See application file for complete search history.

(56) References Cited

U.S. PATENT DOCUMENTS

| 1,034,910 A | 8/1912 | Greenway |
| 1,536,082 A | 5/1925 | Douglas |

(Continued)

FOREIGN PATENT DOCUMENTS

| DE | 198 44 281 A1 | 5/2000 |
| EP | 2 354 824 A1 | 8/2011 |

(Continued)

OTHER PUBLICATIONS

European Search Report, dated Jun. 18, 2019, EP 19 15 3126, Application No. 19513126.8-1201.

*Primary Examiner* — Eric Wong

(57) ABSTRACT

A connector assembly includes a coaxial connector module and a fiber optic module coupled to the coaxial connector module. The coaxial connector module includes a connector body and coaxial contacts in contact channels. The connector body has a mating interface and fastener openings open at the mating interface to receive fasteners and a window at the mating interface. The fiber optic module includes a housing coupled to the mating interface of the connector body having a cavity and fastener openings receiving the fasteners to couple the housing to the connector body at the mating interface. The fiber optic module includes a fiber optic connector received in the cavity having a mating end and a fiber optic cable extending therefrom. The fiber optic connector is received in the window for mating with a mating fiber optic connector of the mating connector assembly.

19 Claims, 23 Drawing Sheets

(51) Int. Cl.
*H01R 24/50* (2011.01)
*G02B 6/42* (2006.01)
*H01R 24/40* (2011.01)
*H01R 13/518* (2006.01)

(52) U.S. Cl.
CPC ......... *G02B 6/4292* (2013.01); *H01R 13/748* (2013.01); *H01R 24/40* (2013.01); *H01R 24/50* (2013.01); *G02B 6/3885* (2013.01); *H01R 13/518* (2013.01)

(56) References Cited

U.S. PATENT DOCUMENTS

| | | | |
|---|---|---|---|
| 1,580,879 A | 4/1926 | Evans | |
| 1,703,046 A | 2/1929 | Paiste | |
| 1,875,378 A | 9/1932 | Hastings | |
| 2,000,318 A | 5/1935 | Cannon | |
| 2,374,971 A | 5/1945 | Benhander | |
| 2,404,682 A | 7/1946 | Baker | |
| 2,410,618 A | 11/1946 | Zelov | |
| 2,659,872 A | 11/1953 | Gilbert | |
| 2,677,811 A | 5/1954 | Anderson et al. | |
| 2,801,395 A | 7/1957 | Quackenbush | |
| 3,002,175 A | 9/1961 | Bertram et al. | |
| 3,128,138 A | 4/1964 | Noschese | |
| 3,177,464 A | 4/1965 | Solorow et al. | |
| 3,266,006 A | 8/1966 | Abbott | |
| 3,277,421 A | 10/1966 | Gobrecht | |
| 3,562,696 A | 2/1971 | Barnhart et al. | |
| 3,566,334 A | 2/1971 | Ziegler, Jr. | |
| 3,668,608 A | 6/1972 | Ziegler, Jr. | |
| 3,671,921 A | 6/1972 | Baker, III et al. | |
| 3,851,946 A | 12/1974 | Piaget et al. | |
| 4,106,834 A | 8/1978 | Horowitz | |
| 4,232,930 A | 11/1980 | Teti | |
| 4,392,699 A | 7/1983 | Weingartner | |
| 4,407,553 A | 10/1983 | Dvorachek et al. | |
| 4,413,875 A | 11/1983 | Mattingly | |
| 4,630,876 A | 12/1986 | Grunberg et al. | |
| 4,659,162 A | 4/1987 | Cartesse | |
| 4,659,164 A | 4/1987 | Reuss | |
| 4,764,130 A | 8/1988 | DiClemente | |
| 4,927,388 A | 5/1990 | Gutter | |
| 4,938,718 A | 7/1990 | Guendel | |
| 4,940,417 A | 7/1990 | Hyogo et al. | |
| 5,000,693 A | 3/1991 | Hatagishi et al. | |
| 5,192,224 A | 3/1993 | Bernardini | |
| 5,217,386 A | 6/1993 | Ohsumi et al. | |
| 5,217,391 A * | 6/1993 | Fisher, Jr. | H01R 24/44 439/578 |
| 5,383,790 A | 1/1995 | Kerek et al. | |
| 5,590,229 A | 12/1996 | Goldman et al. | |
| 5,651,683 A | 7/1997 | Shimamura et al. | |
| 5,671,311 A * | 9/1997 | Stillie | G02B 6/3817 385/60 |
| 5,689,598 A | 11/1997 | Dean, Jr. et al. | |
| 5,791,939 A | 8/1998 | Tanigawa | |
| 6,095,698 A * | 8/2000 | Strab | G02B 6/3817 385/88 |
| 6,485,194 B1 | 11/2002 | Shirakawa | |
| 6,517,380 B1 | 2/2003 | Deutsch | |
| 6,827,597 B1 | 12/2004 | Metzhower et al. | |
| 7,033,211 B2 | 4/2006 | Bartholoma et al. | |
| 7,063,546 B2 | 6/2006 | Akino | |
| 7,070,458 B2 | 7/2006 | Axenbock et al. | |
| 7,485,012 B2 | 2/2009 | Daugherty et al. | |
| 7,517,234 B2 | 4/2009 | Akino | |
| 7,581,984 B2 | 9/2009 | Moyon et al. | |
| 8,066,531 B2 | 11/2011 | Kanatsu | |
| 8,182,297 B2 | 5/2012 | Lin | |
| 8,360,807 B2 | 1/2013 | Buff et al. | |
| 9,130,328 B1 | 9/2015 | Huang et al. | |
| 9,362,638 B2 | 6/2016 | Ljubijankic et al. | |
| 9,368,883 B2 | 6/2016 | Chiang et al. | |
| 9,444,169 B2 | 9/2016 | Gates | |
| 9,627,782 B2 | 4/2017 | Fackler | |
| 9,735,519 B2 | 8/2017 | Yi et al. | |
| 10,116,093 B2 | 10/2018 | Ishibashi | |
| 2004/0253869 A1 | 12/2004 | Yamaguchi et al. | |
| 2009/0028495 A1 * | 1/2009 | Anrig | G02B 6/3813 385/14 |
| 2011/0188810 A1 * | 8/2011 | Ciechomski | G02B 6/3817 385/62 |
| 2013/0236142 A1 * | 9/2013 | Fabian | G02B 6/3878 385/78 |
| 2014/0308008 A1 * | 10/2014 | Mougin | G02B 6/3893 385/71 |
| 2015/0234127 A1 * | 8/2015 | Paul Chen | H05K 1/144 385/61 |
| 2016/0116695 A1 * | 4/2016 | Nekado | G02B 6/421 385/14 |
| 2017/0170611 A1 | 6/2017 | Yi et al. | |
| 2017/0307828 A1 * | 10/2017 | Elenbaas | G02B 6/3817 |
| 2018/0024302 A1 * | 1/2018 | Gurreri | G02B 6/3817 385/59 |
| 2019/0229476 A1 | 7/2019 | Miller et al. | |

FOREIGN PATENT DOCUMENTS

| | | |
|---|---|---|
| WO | 2015/038413 A1 | 3/2015 |
| WO | 2017/100573 A1 | 6/2017 |

* cited by examiner

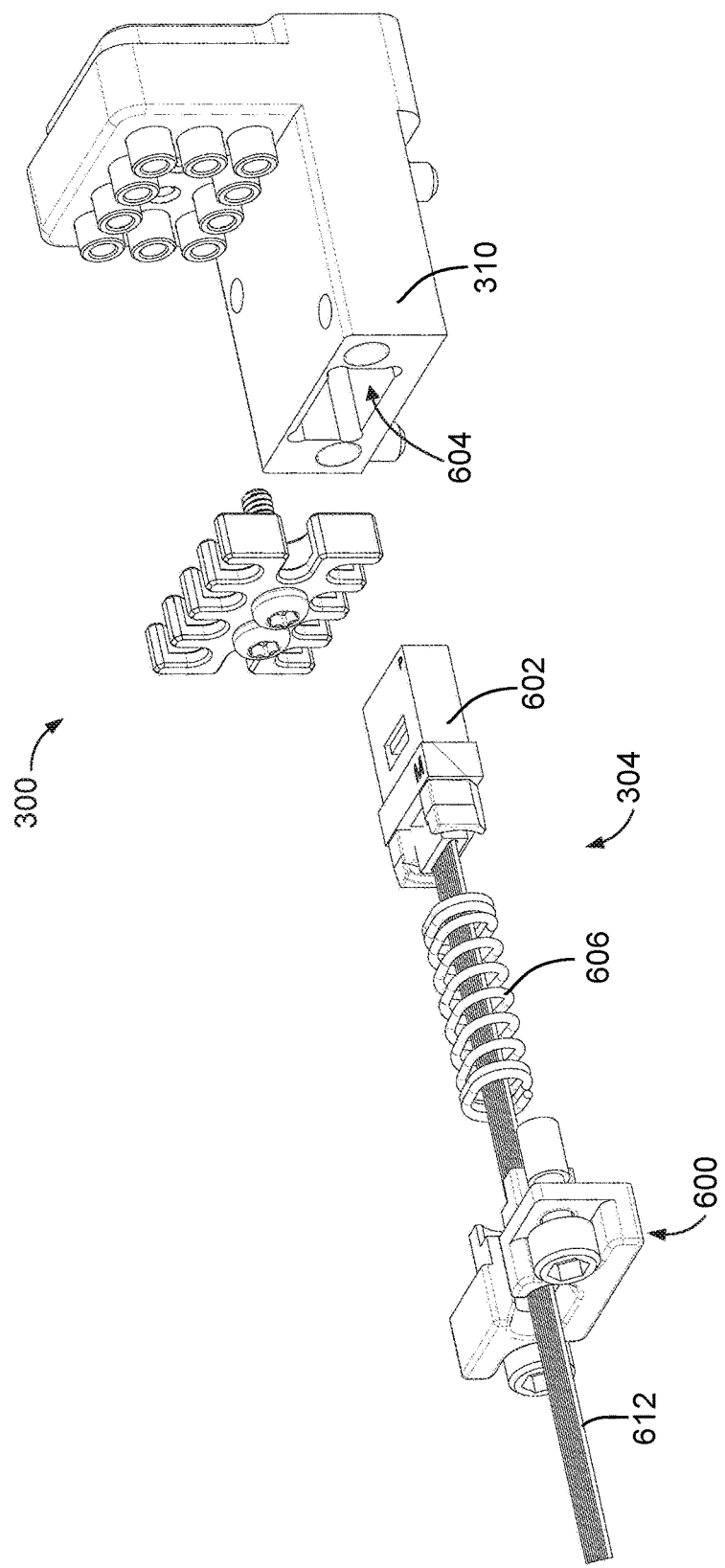

COMMUNICATION SYSTEM HAVING COAXIAL CONNECTOR MODULE AND FIBER OPTIC MODULE

CROSS REFERENCE TO RELATED APPLICATIONS

This application claims benefit to U.S. Provisional Application No. 62/620,207, filed Jan. 22, 2018, titled "COMMUNICATION SYSTEM HAVING COAXIAL CONNECTOR MODULE AND FIBER OPTIC MODULE", the subject matter of which is herein incorporated by reference in its entirety.

BACKGROUND

The subject matter described and/or illustrated herein relates generally to communication systems having connector assemblies.

Connector assemblies are known for interconnecting various components. Some communication systems include different types of connector assemblies having different interfaces. For example, some known communication systems incorporate coaxial connectors and fiber optic connectors within the system. Typically, the coaxial connectors are mounted to one area of the circuit board and the fiber optic connectors are mounted to a different area of the circuit board. As one example, a backplane communication system may include a large backplane circuit board that includes one or more coaxial connectors and one or more fiber optic connectors for mating with corresponding coaxial connectors and fiber optic connectors of a daughter card assembly or assemblies. The coaxial connectors and the fiber optic connectors are typically spread along a mating edge of the backplane circuit board. The coaxial connectors and the fiber optic connectors each occupy a separate footprint of the backplane circuit board. The number and type of connectors that may be provided within a given board area is limited.

Accordingly, there is a need for a communication system having high density of connections.

BRIEF DESCRIPTION

In an embodiment, a connector assembly is provided including a coaxial connector module and a fiber optic module coupled to the coaxial connector module. The coaxial connector module includes a connector body and coaxial contacts. The connector body extends between a front side and a rear side. The connector body has contact channels therethrough holding corresponding coaxial contacts for engaging corresponding mating coaxial contacts of a mating connector assembly. The front side faces in a mating direction along a mating axis. The connector body has a mating interface and fastener openings open at the mating interface to receive fasteners. The connector body has a window at the mating interface. The fiber optic module includes a housing coupled to the mating interface of the connector body. The housing has a cavity and fastener openings aligned with the fastener openings in the connector body and receiving the fasteners to couple the housing to the connector body at the mating interface. The fiber optic module includes a fiber optic connector received in the cavity of the housing. The fiber optic connector has a mating end and a fiber optic cable extending from the fiber optic connector. The fiber optic connector is received in the window for mating with a mating fiber optic connector of the mating connector assembly.

In another embodiment, a connector assembly is provided including a coaxial connector module and a fiber optic module coupled to the coaxial connector module. The coaxial connector module includes a connector body and coaxial contacts. The connector body extends between a front side and a rear side. The connector body has contact channels therethrough holding corresponding coaxial contacts for engaging corresponding mating coaxial contacts of a mating connector assembly. The front side faces in a mating direction along a mating axis. The connector body has a mating interface and fastener openings at the mating interface to receive fasteners. The connector body has a window at the mating interface. The fiber optic module is coupled to the coaxial connector module. The fiber optic module includes a housing coupled to the mating interface of the connector body. The housing has a cavity and fastener openings aligned with the fastener openings in the connector body and receiving the fasteners to couple the housing to the connector body at the mating interface. The fiber optic module includes a fiber optic connector received in the cavity of the housing. The fiber optic connector has a mating end and a fiber optic cable extending from the fiber optic connector. The fiber optic connector is received in the window for mating with a mating fiber optic connector of the mating connector assembly. The connector assembly includes a mounting frame having a mating side and a mounting side that face in opposite directions. The mounting side faces in a mounting direction along the mating axis and configured to interface with a support wall. The mounting frame defines a passage therethrough having a recess that receives the connector body. The mounting frame has a plate pocket at the mounting side open to the recess and a backing plate is removably received in the plate pocket. The backing plate is coupled to the mounting frame to at least partially block the recess at the mounting side. The mounting frame includes blocking surfaces and the backing plate includes a blocking surface. The blocking surfaces of the mounting frame and the blocking surface of the backing plate defining a confined space oversized relative to the connector body to allow a limited amount of floating movement of the connector body and the fiber optic module held by the connector body in the confined space in a lateral direction that is perpendicular to the mating axis.

In a further embodiment, a communication system is provided including a first connector assembly and a second connector assembly coupled to the first connector assembly. The first connector assembly includes a first coaxial connector module and a first fiber optic module coupled to the first coaxial connector module. The first coaxial connector module has a first connector body and first coaxial contacts held by the first connector body. The first connector body has a first mating interface and first fastener openings at the first mating interface to receive first fasteners. The first connector body has a first window open at the first mating interface. The first fiber optic module includes a first housing coupled to the first mating interface of the first connector body and secured thereto by the first fasteners. The first housing has a first cavity receiving a first fiber optic connector having a mating end received in the window. The second connector assembly includes a second coaxial connector module and a second fiber optic module coupled to the second coaxial connector module. The second coaxial connector module has a second connector body and second coaxial contacts held by the second connector body. The second coaxial contacts have biasing springs coupled to the second connector body to allow floating movement when mated to the first coaxial contacts. The second connector body has a second mating interface and second fastener openings at the second mating interface receiving second fasteners. The second connector body has a second window at the second mating interface. The second fiber optic module includes a second housing coupled to the second mating interface and secured thereto by the second fasteners. The second housing has a second cavity receiving a second fiber optic connector having a mating end received in the window the second fiber optic module having a biasing spring coupled to the second housing and the second fiber optic connector to allow floating movement of the second fiber optic connector when mated to the first fiber optic connector.

BRIEF DESCRIPTION OF THE DRAWINGS

FIG. 24 is an exploded view of a connector assembly in accordance with an exemplary embodiment.

DETAILED DESCRIPTION

Embodiments set forth herein include connector assemblies and communication systems that include such connector assemblies. The communication system may include, for example, a circuit board that is secured to the connector assembly. In some embodiments, the communication system is a backplane (or midplane) communication system. As used herein, the terms backplane and midplane are used interchangeably and represent a system interface for multiple daughter card assemblies (e.g., line cards or switch cards). In other embodiments, the communication system is a circuit board assembly (e.g., daughter card assembly). One or more embodiments permit a coaxial connector module of the connector assembly to float during a mating operation. One or more embodiments enable using a denser grouping of coaxial contacts by permitting the coaxial contacts to be rear-loaded into the coaxial connector module. In particular embodiments, the coaxial connector module is permitted to float and also enables rear-loading of coaxial contacts.

As used herein, phrases such as "a plurality of [elements]," "a set of [elements]," "an array of [elements]," and the like, when used in the detailed description and claims, do not necessarily include each and every element that a component may have. For instance, the phrase "the coaxial connector module having a plurality of coaxial contacts that include [a recited feature]" does not necessarily mean that each and every coaxial contact of the coaxial connector module has the recited feature. Instead, only some of the coaxial contacts may have the recited feature and other coaxial contacts of the coaxial connector module may not include the recited feature. As another example, the detailed description or the claims may recite that a connector assembly includes "a cable assemblies, each of which including a [recited feature]." This phrase does not exclude the possibility that other cable assemblies of the connector assembly may not have the recited feature. Accordingly, unless explicitly stated otherwise (e.g., "each and every cable assembly of the coaxial connector module"), embodiments may include similar elements that do not have the same features.

Figure 1:
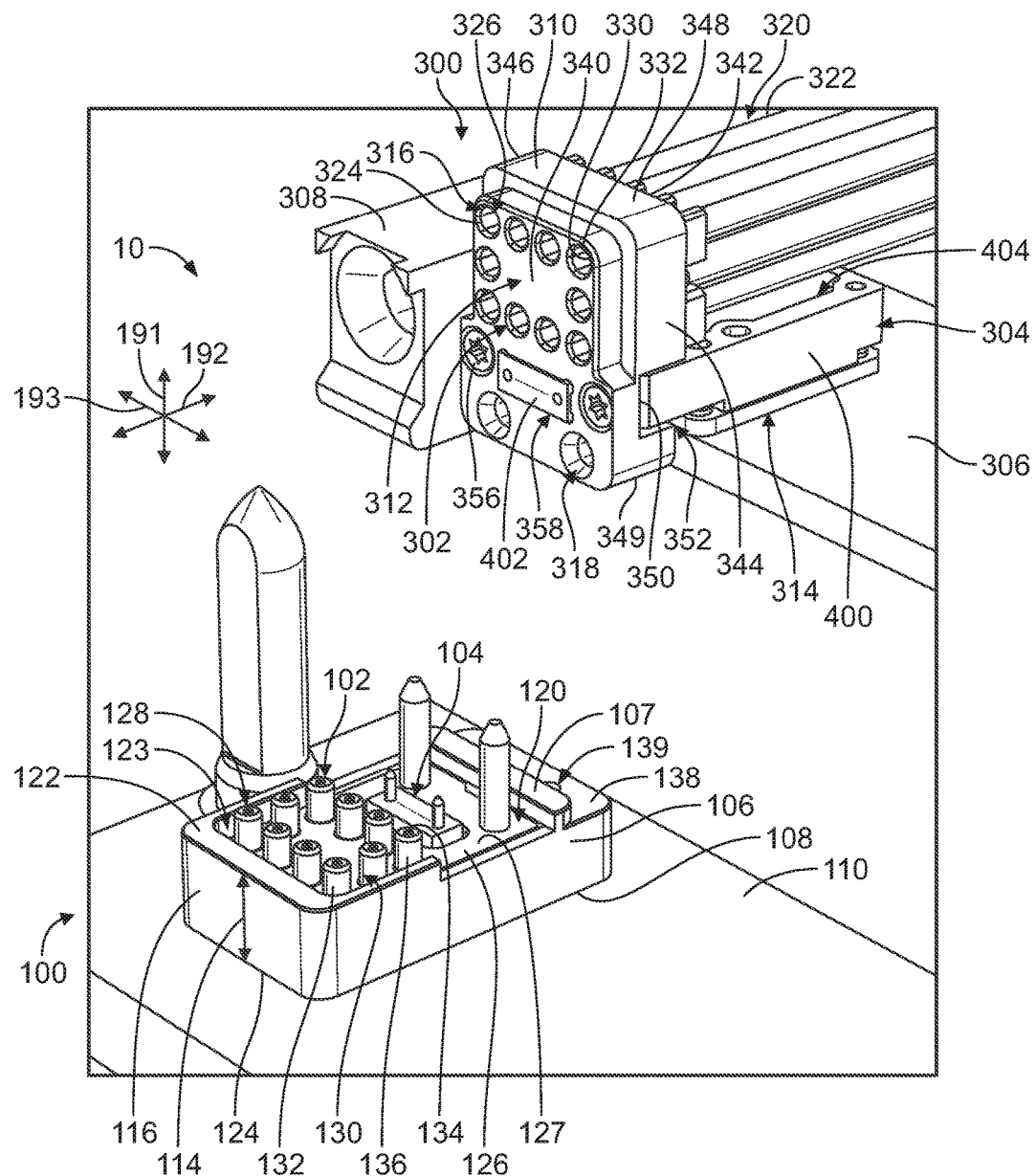
FIG. 1 is a perspective view of a communication system formed in accordance with an exemplary embodiment showing a connector assembly and a connector assembly in an unmated state.

FIG. 1 is a perspective view of a communication system 10 formed in accordance with an exemplary embodiment, showing a connector assembly 100 and a connector assembly 300 in an unmated state. The connector assemblies 100, 300 are configured to be mated along a mating axis. In an exemplary embodiment, the connector assemblies 100, 300 include electrical connectors configured to make an electrical connection and fiber optic connectors configured to make a fiber optic connection. The electrical connector in the fiber optic connector of each connector assembly 100, 300 are combined and integrated in a consolidated mating interface. The electrical connection and the fiber optic connection may be made during a common mating operation. Mating guidance is accomplished using common guidance features. Assembly of the electrical connector and the fiber optic connector to the corresponding supporting structures, such as circuit boards, are accomplished by a common assembly operation because the electrical connector and the fiber optic connector are integrated into the common connector assembly 100, 300.

In some applications, the connector assemblies 100, 300 may be referred to more generally as circuit board assemblies. The electrical connections of the communication system 10 may be performed by RF connectors configured for radiofrequency (RF) applications. In particular embodiments, the communication system 10 and/or its components, such as the connector assembly 100 and/or 300, are configured to satisfy military and aerospace applications. For example, the components of the communication system 10 may be configured to satisfy one or more industry or government standards, such as MIL-STD-348. To illustrate one example of the communication system 10, the connector assemblies 100, 300 may form an interconnect between analog and digital sections of a radio. The connector assembly 300 may perform analog functions. The connector assembly 300 may be replaced with other connector assemblies that are configured to perform the same or different operations. The digital functions, including digital signal processing, may be performed by a communication component (not shown) that is coupled to the connector assembly 100. The other communication component may be another daughter card assembly (not shown).

The communication system 10 and/or its components (e.g., the connector assembly 100 and/or 300) may be configured to satisfy one or more industry or government standards. By way of example only, embodiments may be configured to satisfy the VME International Trade Association (VITA) standards (e.g., VITA 48, VITA 67, et al.). The communication system 10 and/or its components may have an operating speed that achieves 50 GHz or greater. In particular embodiments, the communication system 10 and/or its components may achieve an operating speed of 60 GHz or greater. It should be understood, however, that other embodiments may be configured for different standards and may be configured to operate at different speeds. In some configurations, embodiments may be configured to operate within the range of DC to 60.0 GHz.

In an exemplary embodiment, the connector assembly 300 is a daughter card assembly having a coaxial connector module 302 and a fiber optic module 304 mounted to a substrate 306. The coaxial connector module 302 and the fiber optic module 304 are mounted to the substrate 306 as part of a common connector. The substrate 306 may be a circuit card, such as a daughter card. The connector assembly 300 includes a guide module or guide modules 308 mounted to the substrate 306 proximate to the coaxial connector module 302 and/or the fiber optic module 304. The guide module 308 is used to guide mating with the connector assembly 100. In the illustrated embodiment, the guide module 308 includes an opening configured to receive an alignment pin. The opening may be chamfered or have a lead-in.

The coaxial connector module 302 includes a connector body 310 holding coaxial cable assemblies 320. The connector body 310 extends between a mating end 312 and a mounting end 314. Optionally, the mounting end 314 may be oriented perpendicular to the mating end 312. The mounting end 314 is mounted to the substrate 306. In the illustrated embodiment, the mating end 312 is oriented perpendicular to the substrate 306. The connector body 310 includes a plurality of contact channels 316 receiving corresponding coaxial cable assemblies 320. The connector body 310 includes alignment features 318 for aligning the coaxial connector module 302 with the connector assembly 100 during mating. In the illustrated embodiment, the alignment features 318 are openings and may be referred to hereinafter as openings 318. Other types of alignment features may be provided in alternative embodiments.

Each coaxial cable assembly 320 includes a cable 322 and a coaxial contact 324 terminated to the end of the cable 322 and the coaxial contact 324 has a mating end 326 for mating with the connector assembly 100. In an exemplary embodiment, the coaxial contact 324 is an RF contact. The coaxial contact 324 includes an inner contact 330 and an outer contact 332 surrounding the inner contact 330. The inner contact 330 is configured to be terminated to a conductor of the cable 322. The outer contact 332 is configured to be terminated to a shield, such as a cable braid, of the cable 322. Other arrangements are possible in alternative embodiments. In alternative embodiments, the connector assembly 300 does not include the cables 322 that directly couple to the coaxial contacts 324. For example, the coaxial contacts 324 may directly terminate to the substrate 306 (for example, the daughtercard) and/or may be communicatively coupled to cables through traces and vias (not shown) of the substrate 306.

The connector body 310 extends between a front side 340 and a rear side 342. The connector body 310 has a first side 344 and a second side 346 opposite the first side 344 extending between the front side 340 and the rear side 342. The connector body 310 has a first end 348 and a second end 349 opposite the first end 348 extending between the front side 340 and the rear side 342. In the illustrated embodiment, the front side 340 defines the mating end 312 and the second end 349 defines the mounting end 314; however, other arrangements are possible in alternative embodiments. The front side 340 faces in a mating direction along a mating axis. The connector body 310 has a mating interface 350 for mating with the fiber optic module 304. In the illustrated embodiment, the mating interface 350 is provided at the rear side 342; however, other locations are possible in alternative embodiments. In the illustrated embodiment, the connector body 310 includes a pocket 352 defining the mating interface 350. The pocket 352 receives a portion of the fiber optic module 304. For example, the fiber optic module 304 may be nested in the pocket 352 of the connector body 310. The pocket 352 may be open at the rear side 342 and/or may be open at the first side 344 and/or the second side 346.

In an exemplary embodiment, the connector body 310 includes fastener openings 354 (shown in FIG. 7) open to the mating interface 350 that receive fasteners 356 used to secure the fiber optic module 304 to the connector body 310. In the illustrated embodiment, the fastener openings 354 are open at the front side 340; however, other locations are possible in alternative embodiments, such as at the second end 349.

In an exemplary embodiment, the connector body includes a window 358 at the front side 340 open to the mating interface 350. The window 358 defines a passage through the connector body 310 between the front side 340 and the rear side 342. The window 358 receives a portion of the fiber optic module 304 such that the fiber optic module 304 is presented at the mating end 312 for mating with the connector assembly 100. The connector body 310 may encase the window 358 such that the connector body 310 extends entirely around the fiber optic module 304 at the mating end 312. Optionally, the fiber optic module 304 may extend entirely through the window 358 beyond the front side 340 for mating with the connector assembly 100.

The fiber optic module 304 includes a housing 400 holding a fiber optic connector 402. The housing 400 is configured to be coupled to the substrate 306. In various embodiments, the substrate 306 is a circuit board and the fiber optic module 304 is electrically connected to the circuit board. For example, fiber optic module 304 may include a digital to optical transceiver to convert between digital signals and optical signals. The housing 400 includes a cavity 404 receiving the fiber optic connector 402. The housing 400 is coupled to the connector body 310 at the mating interface 350. For example, the housing 400 may be received in the pocket 352 and secured in the pocket 352 by the fasteners 356. The fasteners 356 create a rigid mechanical connection between the connector body 310 and the housing 400. The fiber optic module 304 is coupled to the coaxial connector module 302 such that the fiber optic connector 402 is aligned with and received in the window 358. The fiber optic connector 402 extends through the coaxial connector module 302 for mating with the connector assembly 100.

Figure 2:
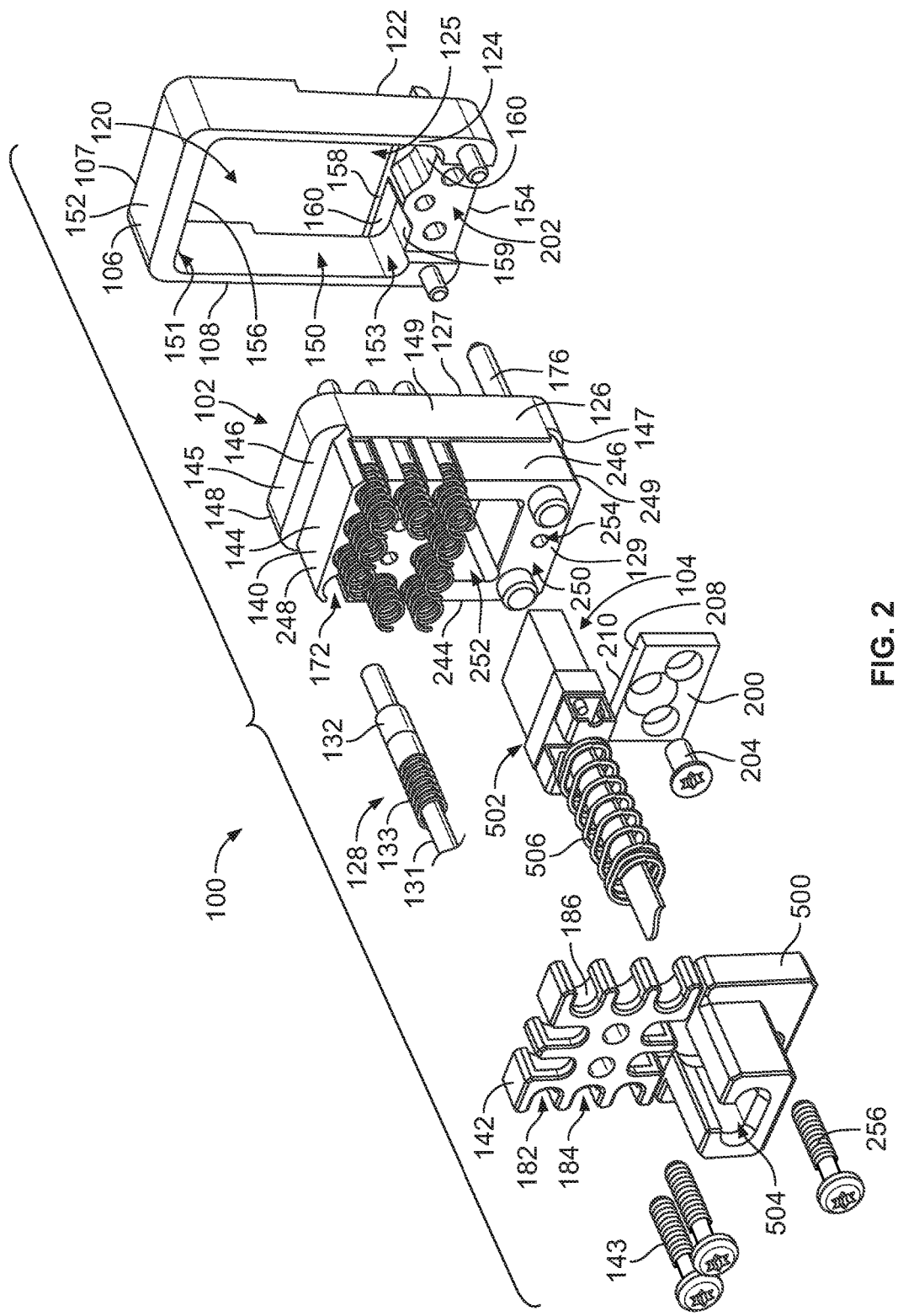
FIG. 2 is a rear exploded view of the connector assembly in accordance with an exemplary embodiment showing a coaxial connector module and a fiber optic module.

For reference, the connector assembly 100 is oriented with respect to mutually perpendicular axes 191-193, which includes a mating axis 191, a first lateral axis 192, and a second lateral axis 193 (the connector assembly 300 is illustrated in FIG. 1 rotated 90° relative to the mating direction shown in in FIG. 2). The first and second lateral axes 192, 193 may define a lateral plane. As used herein, if an element moves "laterally" or in a "lateral direction," the movement may be in any direction along the lateral plane. For example, the movement may be parallel to the first lateral axis 192, parallel to the second lateral axis 193, or in a direction with a component along the first lateral axis 192 and a component along the second lateral axis 193. The connector assembly 100 may have any orientation with respect to gravity.

The connector assembly 100 includes a coaxial connector module 102 and a fiber optic module 104 coupled to the coaxial connector module 102. The connector assembly 100 includes a mounting frame 106 coupled to the coaxial connector module 102 and/or the fiber optic module 104 for supporting the coaxial connector module 102 and the fiber optic module 104. The coaxial connector module 100 is mounted to a support wall 110 and supports the coaxial connector module 102 and the fiber optic module 104 relative to the support wall 110. The support wall 110 may be, for example, a circuit board (for example, a backplane circuit board), a panel, or another type of wall. The mounting frame 106 is used to secure the coaxial connector module 102 and the fiber optic module 104 to the support wall 110.

In an exemplary embodiment, the mounting frame 106 is slightly oversized relative to the coaxial connector module 102 such that the coaxial connector module 102 and the fiber optic module 104 coupled to the coaxial connector module 102 have a limited amount of floating movement relative to the mounting frame 106, such as for alignment with the connector assembly 300 during mating. During operation or usage of the connector assembly 100, a portion of the coaxial connector module 102 is floatably held in the mounting frame 106, to allow relative movement between the support wall 110 and the coaxial connector module 102 and the fiber optic module 104 coupled to the coaxial connector module 102. For example, the coaxial connector module 102 and the fiber optic module 104 are permitted to move in a lateral direction during a mating operation (for example, parallel to the plane of the support wall 110) for alignment and mating with the coaxial connector module 302 and the fiber optic module 304, respectively. The lateral direction may be parallel to the first lateral axis 192 or parallel to the second lateral axis 193. However, it should be understood, that the lateral direction may be any direction that is perpendicular to the mating axis 191 or parallel to a plane defined by the first and second lateral axes 191, 192.

The mounting frame 106 includes opposite mating and mounting sides 107, 108. More specifically, the mating side 107 is configured to face in a mating direction (for example, forward) along the mating axis 191, and the mounting side 108 is configured to face in a mounting direction (for example, rearward) along the mating axis 191 that is opposite the mating direction. The mounting frame 106 has a thickness 114 that is defined between the mating and mounting sides 107, 108. The mounting frame 106 has an outer frame edge or wall 116 that defines an outer perimeter or border of the mounting fame 106. In the illustrated embodiment, the mounting frame 106 has a substantially rectangular profile that is defined by the outer frame edge 116, but the mounting frame 106 may have profiles with other shapes in alternative embodiments.

Also shown, the mounting frame 106 includes a passage 120 that extends through the mating and mounting sides 107, 108. The passage 120 is sized and shaped to receive a portion of the coaxial connector module 102. The fiber optic module 104 is also received in the passage 120. The mounting frame 106 includes a front edge 122 (FIG. 1) along the mating side 107, and a back edge 124 (FIG. 2) along the mounting side 108. The front edge 122 defines a front opening 123 (FIG. 1) to the passage 120, and the back edge 124 defines a back opening 125 (FIG. 2) to the passage 120. The passage 120 extends between the front and back openings 123, 125.

In an exemplary embodiment, the front and back edges 122, 124 are dimensioned to form blocking surfaces (described below) that engage the coaxial connector module 102 and retain the coaxial connector module 102 in the mounting frame 106. The blocking surfaces prevent the coaxial connector module 102 from passing freely through the passage 120. The blocking surfaces may also prevent the coaxial connector module 102 from moving laterally beyond a confined space. For example, the blocking surfaces form boundaries that define the limited amount of floating movement of the coaxial connector module 102 relative to the mounting frame 106.

The coaxial connector module 102 includes a connector body 126 having a front side 127 and a rear side 129 (FIG. 3) that face in the mating direction and the mounting direction, respectively. The coaxial connector module 102 also includes a contact array 130 of coaxial contacts 132 that are coupled to the connector body 126. In particular embodiments, a pitch (or center-to-center spacing) between adjacent coaxial contacts 132 may be between 1.50 mm and 5.00 mm. In particular embodiments, the pitch may be between 2.00 mm and 3.50 mm or, more particularly, between 2.50 mm and 2.9 mm. In other embodiments, however, the pitch may be greater or smaller.

The connector body 126 holds the coaxial contacts 132 at designated positions for engaging corresponding coaxial contacts 324 (FIG. 1). In the illustrated embodiment, the coaxial contacts 132 are elements of corresponding coaxial cable assemblies 128. The coaxial contacts 132 represent mating ends of the corresponding coaxial cable assemblies 128. Each of the coaxial contacts 132 includes a signal element 134 (FIG. 1) and a ground element 136 (FIG. 1) that is coaxially aligned with the signal element 134. The signal and ground elements 134, 136 may be electrically coupled to signal and ground paths (not shown) through cables 131 of the coaxial cable assemblies 128. The signal element 134 may be a center contact 134 and the ground element 136 may be an outer contact 136.

The mounting frame 106 may include a frame extension 138. The frame extension 138 represents a section of the mounting frame 106 that extends laterally away from the passage 120. The frame extension 138 is configured to interface with the support wall 110. For example, the mounting frame 106 may include posts extending from the mounting side 108 that are received in corresponding openings in the support wall 110 to orient the mounting frame 106 relative to the support wall 110. The frame extension 138 includes one or more through holes 139 that are sized and shaped to receive hardware (e.g., screws, bolts, plugs, and the like) for securing the mounting frame 106 to the support wall 110. In some embodiments, the through holes 139 may be defined by threaded surfaces of the mounting frame 106 for engaging screws. In other embodiments, the surfaces that define the through holes 139 are not threaded. The mounting frame 106 is configured to have a fixed position relative to the support wall 110. The coaxial connector module 102, on the other hand, is permitted to float relative to the support wall 110 within the confined space.

Figure 3:
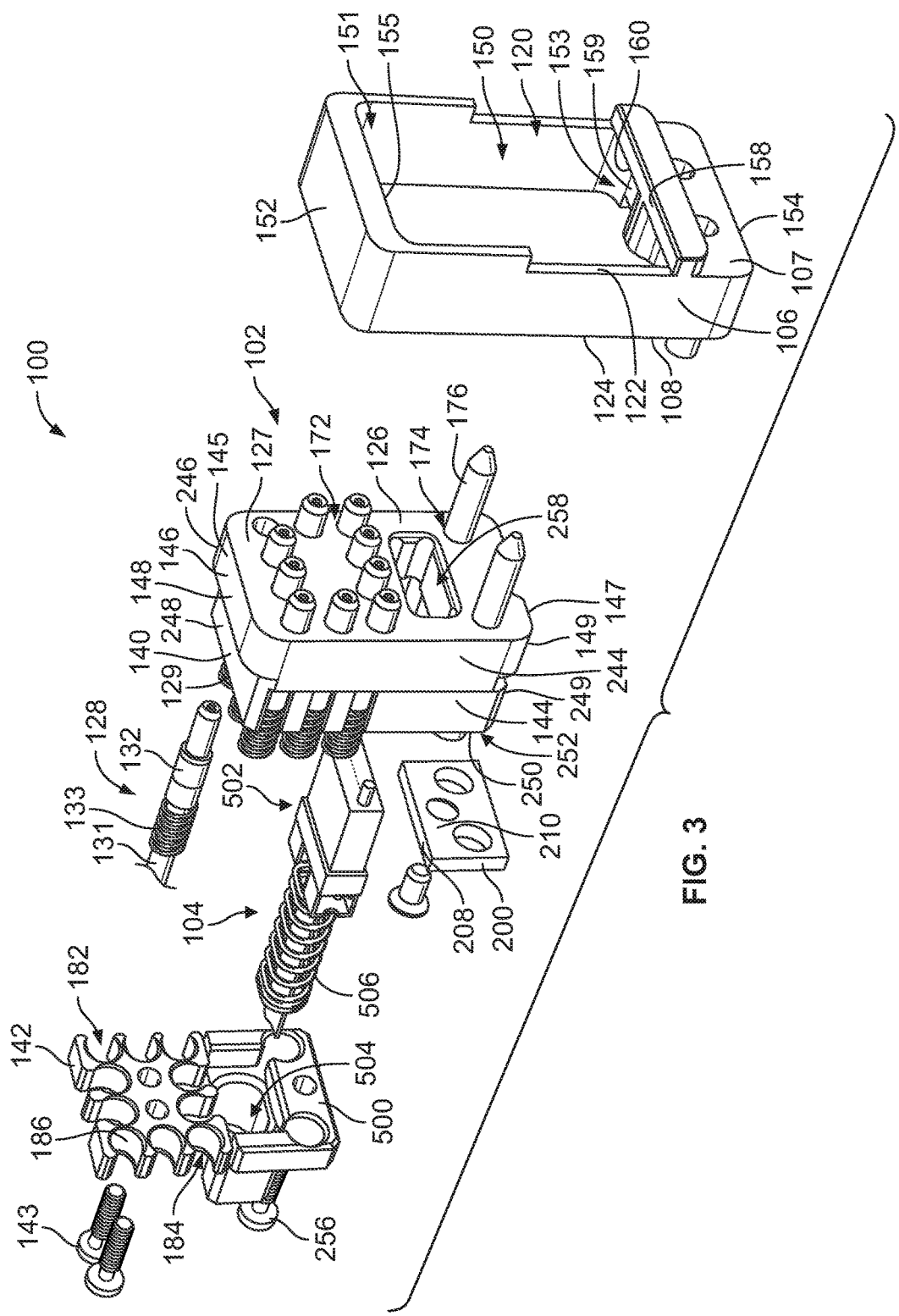
FIG. 3 is a front exploded view of the connector assembly showing the coaxial connector module and the fiber optic module.

FIG. 2 is a rear exploded view of the connector assembly 100 showing the coaxial connector module 102 and the fiber optic module 104. FIG. 3 is a front exploded view of the connector assembly 100 showing the coaxial connector module 102 and the fiber optic module 104. The connector body 126 includes a forward section 140 and a rear section 142. The forward and rear sections 140, 142 are discrete elements that are configured to be secured to each other. In the illustrated embodiment, the forward and rear sections 140, 142 are secured to each other using hardware 143 (e.g., screws), but may be secured to each other in other manners in alternative embodiments. In various embodiments, the hardware 143 are captive screws configured to be held in the rear section 142, such as to make assembly easier and/or to prevent losing the hardware 143 during assembly. The forward section 140 includes a main portion 144 and a flange portion 145 that extends laterally (or radially) away from the main portion 144. The flange portion 145 may be defined by a first lip 146 and a second lip 147 at opposite first and second sides 148, 149. The flange portion 145 may include other lips in alternative embodiments, such as a lip along the top and/or the bottom. In an exemplary embodiment, the flange portion 145 is provided at the front side 127 of the connector body 126. The lips 146, 147 may include rearward-facing surfaces facing in the mounting direction.

The mounting frame 106 includes a connector-receiving recess 150 of the passage 120 that opens along the mounting side 108 to receive the connector body 126. The recess 150 includes a first cavity 151 at a first side 152 of the mounting frame 140 and a second cavity 153 at a second side 154 of the mounting frame 140. The connector-receiving recess 150 is sized and shaped to receive the main portion 144 of the connector body 126 and the cavities 151, 153 are sized and shaped to receive the flange portion 145, such as the first lip 146 and the second lip 147, respectively. In an exemplary embodiment, the first cavity 151 is defined by a front rim 155 at the mating side 107 and a rear rim 156 at the mounting side 108. The first cavity 151 includes a cavity wall 157 between the front rim 155 and the rear rim 156 at the first end of the recess 150. The first cavity 151 is open at the first side of the recess 150 and is closed or blocked by the front rim 155, the rear rim 156 in the cavity wall 157. In an exemplary embodiment, the second cavity 153 is defined by a front rim 158 at the mating side 107 and a cavity wall 159 opposite the cavity wall 157. The second cavity 153 is open at the mounting side 108, such as for loading the connector body 126 into the recess 150.

The connector-receiving recess 150 is defined by blocking surfaces 160 used to block or retain the coaxial connector module 102 and the mounting frame 106. The blocking surfaces 160 may limit or restrict movement of the coaxial connector module 102 in an axial direction along the mating axis 191. The blocking surfaces 160 may limit or restrict movement of the coaxial connector module 102 in a lateral direction along the lateral axis 192 and/or the lateral axis 193. In an exemplary embodiment, the blocking surfaces 160 are defined by the front rim 155, the rear rim 156, the cavity wall 157, the front rim 158 and the cavity wall 159. The mounting frame 106 may include additional blocking surfaces 160 in alternative embodiments, such as blocking surfaces 160 defined by the top and the bottom of the recess 150. In an exemplary embodiment, the blocking surfaces 160 include front blocking surfaces, rear blocking surfaces and end blocking surfaces. The front blocking surfaces limit or restrict movement in the mating direction. The rear blocking surfaces 160 to limit or restrict movement in the mounting direction. The end blocking surfaces limit or restrict movement in the lateral direction. In an exemplary embodiment, the front rims 155, 158 define the front blocking surfaces, the rear rim 156 defines the rear blocking surface and the cavity walls 157, 159 and the top and the bottom define the end blocking surfaces. The end blocking surfaces face in the lateral direction that is perpendicular to the mating axis 191 to limit or restrict movement in the lateral direction. Optionally, the recess 150 may be oversized to allow a limited amount of floating movement in the lateral direction. For example, the end blocking surfaces may be wider than the connector body 126 to allow shifting in at least one of the lateral directions 192, 193. In various embodiments, the end blocking surfaces may permit the coaxial connector module 102 to float at least 0.15 mm along a lateral plane. In various embodiments, the coaxial connector module 102 may be permitted to float at least 0.25 mm or, more particularly, at least 0.35 mm along the lateral plane. It should be understood, however, that the connector assembly 100 may be configured to permit a greater or lesser amount of floating than the values provided above. The amount of floating movement may be controlled based on manufacturing tolerances of the connector assemblies 100, 300.

The first lip 146 of the flange portion 145 is configured to be retained or trapped between the front and rear rims 155, 156 of the mounting frame 106. The blocking surfaces 160 may limit axial movement. Optionally, the coaxial connector module 102 may have a limited amount of floating movement in the axial direction between the front and rear rims 155, 156. Alternatively, the first lip 146 may have a tight fit between the front and rear rims 155, 156 such that there is no movement in the axial direction.

In an exemplary embodiment, the connector assembly 100 includes a backing plate 200 configured to be coupled to the mounting frame 106. The backing plate 200 is used to secure the coaxial connector module 102 and the recess 150. In an exemplary embodiment, the mounting frame 106 includes a plate pocket 202 at the mounting side 108, such as at the second side 154. The plate pocket 202 is sized and shaped to receive the backing plate 200. Optionally, the backing plate 200 may be loaded into the plate pocket 202 from behind the mounting frame 106. In alternative embodiments, the backing plate 200 may be loaded into the plate pocket 202 from the side, such as from the exterior side of the mounting frame 106 or from the interior side in the recess 150. In an exemplary embodiment, the backing plate 200 may be secured to the mounting frame 106, such as using a fastener 204. Other securing means may be used in alternative embodiments.

In an exemplary embodiment, an inner edge 208 of the backing plate 200 may extend into the recess 150 to overlap and retain the coaxial connector module 102 in the recess 150. The backing plate 200 includes a blocking surface 210 that defines a rear blocking surface for the coaxial connector module 102. The inner edge 208 is configured to be positioned rearward of the second cavity 153. When the connector body 126 is loaded into the recess 150, the backing plate 200 may be positioned rearward of the connector body 126, such as rearward of the second lip 147 to restrict or block removal of the coaxial connector module 102 from the recess 150. The backing plate 200 is used to contain the coaxial connector module 102 and the mounting frame 106 such that the coaxial connector module 102 and the mounting frame 106 may be mounted to the support wall 110 as a unit. The coaxial connector module 102 may be held in the mounting frame 106 using the backing plate 200 without the need for the support wall 110 to hold the coaxial connector module 102 in the mounting frame 106.

In an exemplary embodiment, the forward section 140 and the rear section 142 of the connector body 126 are coupled together using the fasteners 143. The forward section 140 includes a plurality of contact cavities 172, and the rear section 142 includes a plurality of contact cavities 182. When the forward and rear sections 140, 142 are coupled to each other, the contact cavities 172 of the forward section 140 and the contact cavities 182 of the rear section 142 align with each other to form contact channels 184 (shown in FIG. 5). Each of the contact channels 184 is configured to receive a portion of a corresponding coaxial cable assembly 128 and, in particular, a corresponding coaxial contact 132. Optionally, the contact cavities 182 may open to an outer edge to define open-sided slots sized and shaped to receive the cables 131 of the coaxial cable assemblies 128. The contact cavities 182 may include ledges 186, such as at the rear of the rear section 142, that are used to support the springs of the cable assemblies 128.

In an exemplary embodiment, the coaxial cable assemblies 128 include biasing springs 133 configured to be coupled between the connector body 126 and the coaxial contact 132 to allow floating movement of the coaxial contacts 132 in the contact channels 184. The biasing springs 133 are received in corresponding contact channels 184. The biasing springs 133 may engage the coaxial contacts 132 and may engage the ledges 186 at the rear of the rear section 142. When the connector assembly 100 is mated with the connector assembly 300, the coaxial contacts 132 may be compressed and pushed rearward. The biasing springs 133 may allow the coaxial contacts 132 to move axially rearward. The biasing springs 133 provided biasing force for mating the coaxial contacts 132 with the mating contacts 324 of the connector assembly 300.

In the illustrated embodiment, the forward section 140 includes alignment channels 174 that extend entirely through the forward section 140. The alignment channels 174 are configured to receive alignment posts 176 that are configured to clear the front side 127 and the passage 120 and project away from the mounting frame 106 in the mating direction. The alignment posts 176 are configured to engage the mating connector 302 (shown in FIG. 1) during the mating operation. In the illustrated embodiment, the connector assembly 100 includes two alignment posts 176. In other embodiments, however, the connector assembly 100 may include only one alignment post 176 or more than two alignment posts 176.

The connector body 126 has a first side 244 and a second side 246 opposite the first side 244 extending between the front side 127 and the rear side 129. The connector body 126 has a first end 248 and a second end 249 opposite the first end 248 extending between the front side 127 and the rear side 129. The connector body 126 has a mating interface 250 for mating with the fiber optic module 104. In the illustrated embodiment, the mating interface 250 is provided at the rear side 129; however, other locations are possible in alternative embodiments. In the illustrated embodiment, the connector body 126 includes a pocket 252 defining the mating interface 250. The pocket 252 may be defined rearward of the rear side 129 of the forward section 140 of the connector body 126 and below the rear section 142 of the connector body 126. A portion of the pocket 252 may extend into the forward section 140. The pocket 252 receives a portion of the fiber optic module 104. For example, the fiber optic module 104 may be nested in the pocket 252 of the connector body 126. The pocket 252 may be open at the rear side 129 and/or may be open at the first side 244 and/or the second side 246 and/or the $2^{nd}$ end 249. Optionally, the forward portion of the pocket 252 may be enclosed by the connector body 126.

In an exemplary embodiment, the connector body 126 includes fastener openings 254 open to the mating interface 250 that receive fasteners 256 used to secure the fiber optic module 104 to the connector body 126. In the illustrated embodiment, the fastener openings 254 are open at the rear side 129; however, other locations are possible in alternative embodiments, such as at the second end 249.

In an exemplary embodiment, the connector body includes a window 258 at the front side 127 open to the mating interface 250. The window 258 defines a passage through the connector body 126 between the front side 127 and the rear side 129. The window 258 receives a portion of the fiber optic module 104 such that the fiber optic module 104 is presented at the mating end for mating with the connector assembly 100. The connector body 126 may encase the window 258 such that the connector body 126 extends entirely around the fiber optic module 104 at the mating end. Optionally, the fiber optic module 104 may extend entirely through the window 258 beyond the front side 127 for mating with the connector assembly 100.

The fiber optic module 104 includes a housing 500 holding a fiber optic connector 502. The housing 500 is configured to be coupled to the connector body 126. The housing 500 includes a cavity 504 receiving the fiber optic connector 502. The housing 500 is coupled to the connector body 126 at the mating interface 250. For example, the housing 500 may be received in the pocket 252 and secured in the pocket 252 by the fasteners 256. The fasteners 256 create a rigid mechanical connection between the connector body 126 and the housing 500. The fiber optic module 104 is coupled to the coaxial connector module 302 such that the fiber optic connector 502 is aligned with and received in the window 258. The fiber optic connector 502 extends through the coaxial connector module 302 for mating with the connector assembly 100.

In an exemplary embodiment, the fiber optic module 104 includes a biasing spring 506 configured to be coupled between the housing 500 and the fiber optic connector 502 to allow floating movement of the fiber optic connector 502 in the cavity 504. The biasing spring 506 may engage the housing 500 at the rear of the cavity 504. When the connector assembly 100 is mated with the connector assembly 300, the fiber optic connector 502 may be compressed and pushed rearward. The biasing spring 506 allows the fiber optic connector 502 to move axially rearward. The biasing springs 506 provides biasing force for mating the fiber optic connector 502 with the mating fiber optic connector 402 (shown in FIG. 1) of the connector assembly 300.

Figure 4:
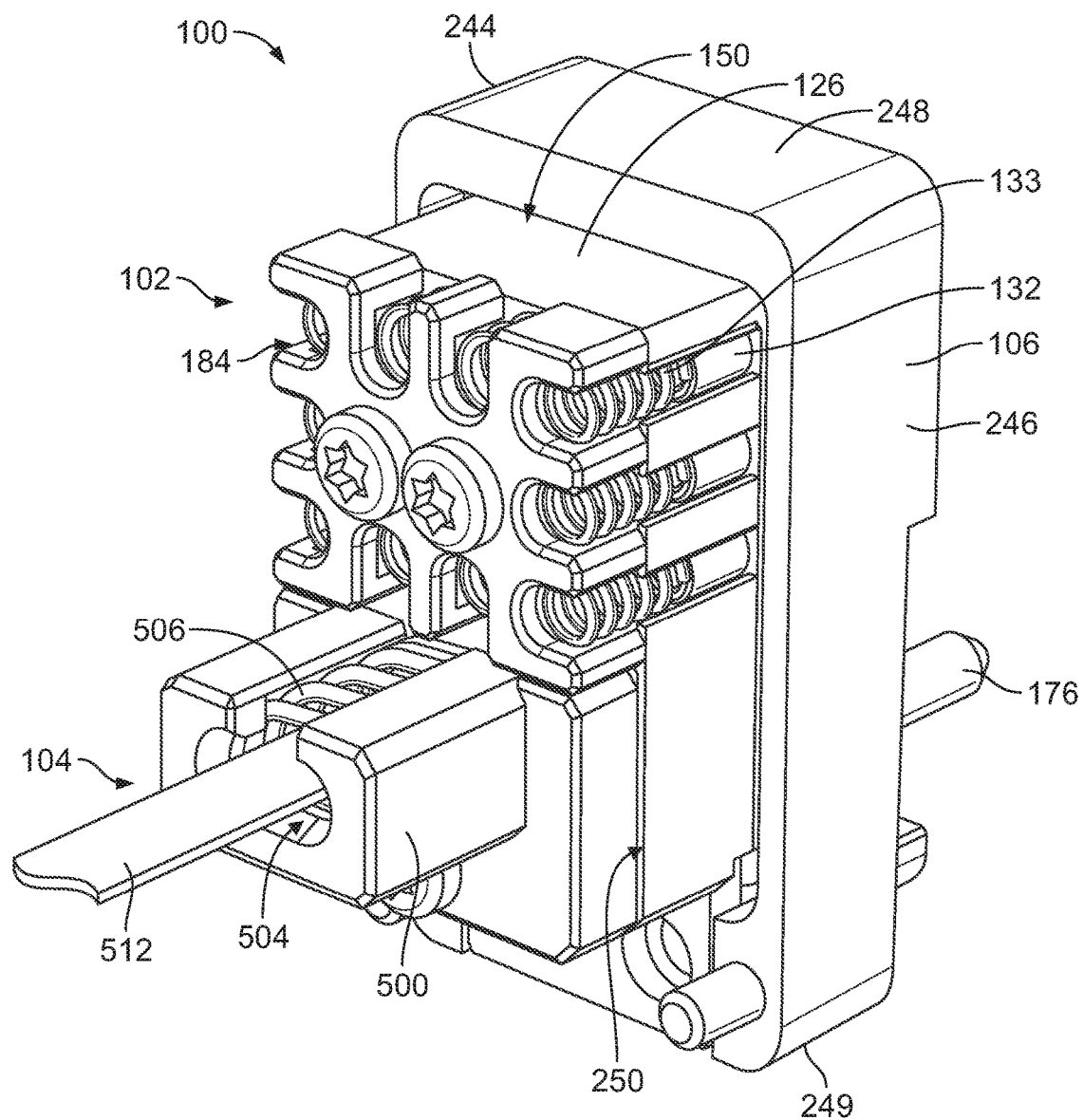
FIG. 4 is a rear perspective view of the connector assembly in an assembled state showing the coaxial connector module and the fiber optic module.
Figure 5:
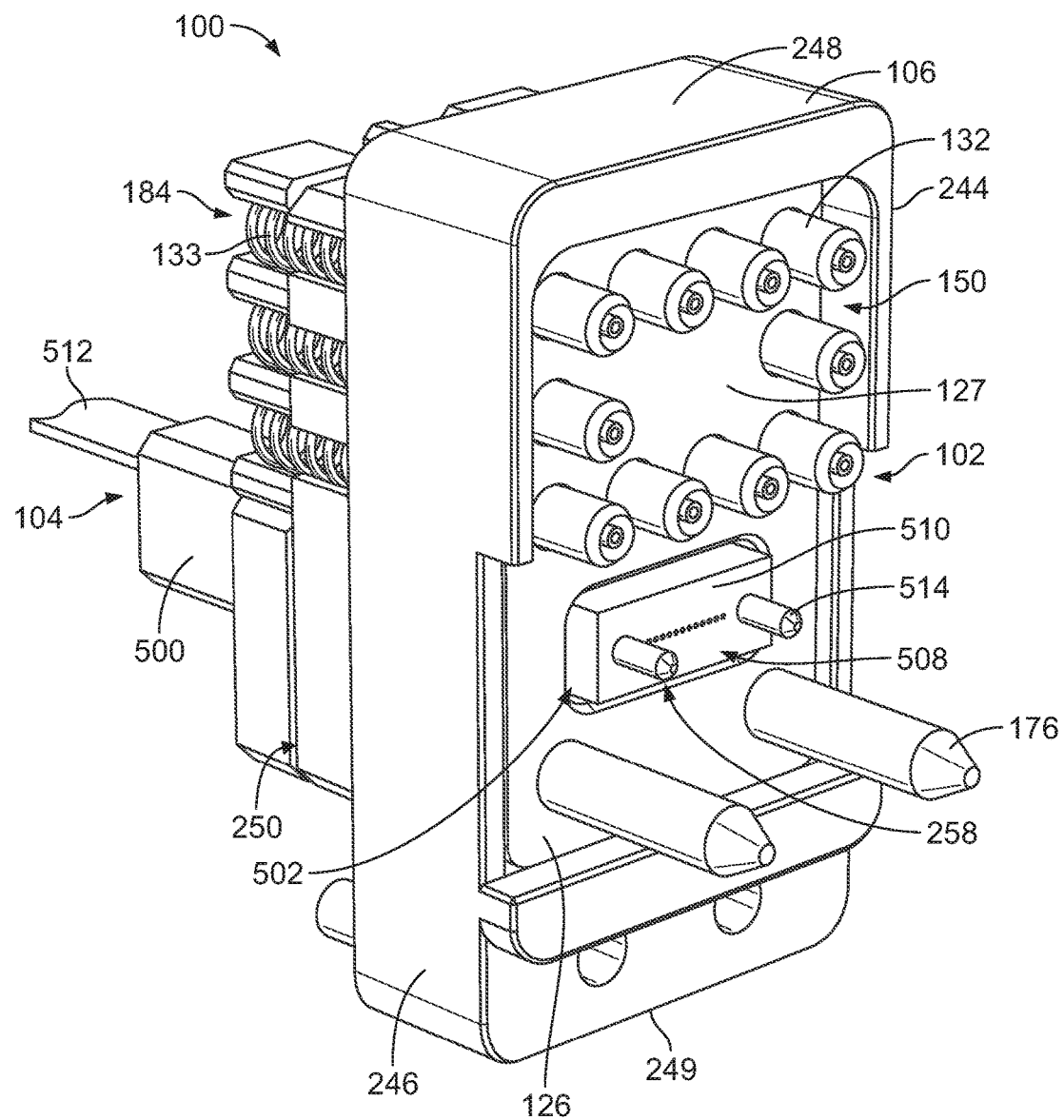
FIG. 5 is a front perspective view of the connector assembly in an assembled state showing the coaxial connector module and the fiber optic module.

FIG. 4 is a rear perspective view of the connector assembly 100 in an assembled state showing the coaxial connector module 102 and the fiber optic module 104. FIG. 5 is a front perspective view of the connector assembly 100 in an assembled state showing the coaxial connector module 102 and the fiber optic module 104. The fiber optic module 104 is shown coupled to the coaxial connector module 102. The housing 500 is coupled to the mating interface 250 of the connector body 126. The fiber optic connector 502 is held in the housing 500 and a mating end 508 of the fiber optic connector 502 is received in the window 258 for mating with the fiber optic connector 402 (shown in FIG. 1). In an exemplary embodiment, the fiber optic connector 502 includes a ferrule 510 at the mating end 508. The ferrule 510 may hold fibers for transmitting light. A fiber optic cable 512 extends from the fiber optic connector 502. For example, the fiber optic cable 512 extends rearward of the housing 500. In an exemplary embodiment, the fiber optic connector 502 includes guide features 514 extending forward of the ferrule 510 to guide mating with the fiber optic connector 402.

The connector assembly 100 includes the RF connector interface defined by the coaxial contacts 132 and the fiber optic connector interface defined by the fiber optic connector 502. Both interfaces are presented within the same connector assembly 100. For example, the mating end 508 of the fiber optic connector 502 is located immediately adjacent the array of coaxial contacts 132. The mating ends of the coaxial contacts 132 and the mating end 508 of the fiber optic connector 502 are presented at the front side 127 of the connector body 126.

The alignment post 176 extend forward of the front side 127 of the connector body 126. The alignment posts 176 extend further forward than the coaxial contacts 132 and the fiber optic connector 502 such that the alignment posts 176 are used to align the interfaces prior to mating with the connector assembly 300 (shown in FIG. 1). The alignment posts 176 define guide features for guiding mating with the connector assembly 300. In the illustrated embodiment, the window 258 and the fiber optic connector 502 are located between the alignment posts 176 and the coaxial contacts 132. For example, the alignment posts 176 are provided near the bottom of the connector body 126, the coaxial contacts 132 are provided near the top of the connector body 126 and the fiber optic connector 502 is provided near the center of the connector body 126. Other arrangements are possible in alternative embodiments.

In an exemplary embodiment, the connector body 126 has a perimeter defined by the ends 248, 249 and the sides 244, 246. The coaxial contacts 132 are arranged in an array within the perimeter of the connector body 126. The window 258 is contained within the perimeter such that the mating end 508 of the fiber optic connector 502 is contained within the perimeter. The window 258 is encased by the connector body 126 such that the connector body 126 extends entirely around the ferrule 510 of the fiber optic connector 502.

The connector body 126 holds the biasing springs 133 in the contact channels 184 engaging the corresponding coaxial contacts 132 to allow axial compression of the coaxial contacts 132 when mated with the coaxial contacts 324 (shown in FIG. 1). The housing 500 holds the biasing spring 506 in the cavity 504 engaging the fiber optic connector 502 to allow axial compression of the fiber optic connector 502 when mated with the fiber optic connector 402.

The mounting frame 106 surrounds the connector body 126 and the fiber optic module 104. The connector body 126 is received in the recess 150 and holds the fiber optic connector 502 in the recess 150. The recess 150 is oversized relative to the connector body 126 to allow a limited amount of floating movement of the connector body 126 in the recess 150 within the confined space defined by blocking surfaces of the mounting frame 106 to allow relative movement of the connector body 126 and the fiber optic module 104 for mating with the connector assembly 300. The coaxial cables 131 and the fiber optic cable 512 extend rearward from the connector assembly 100 and are configured to pass through the support wall 110 (shown in FIGS. 1 and 10).

Figure 6:
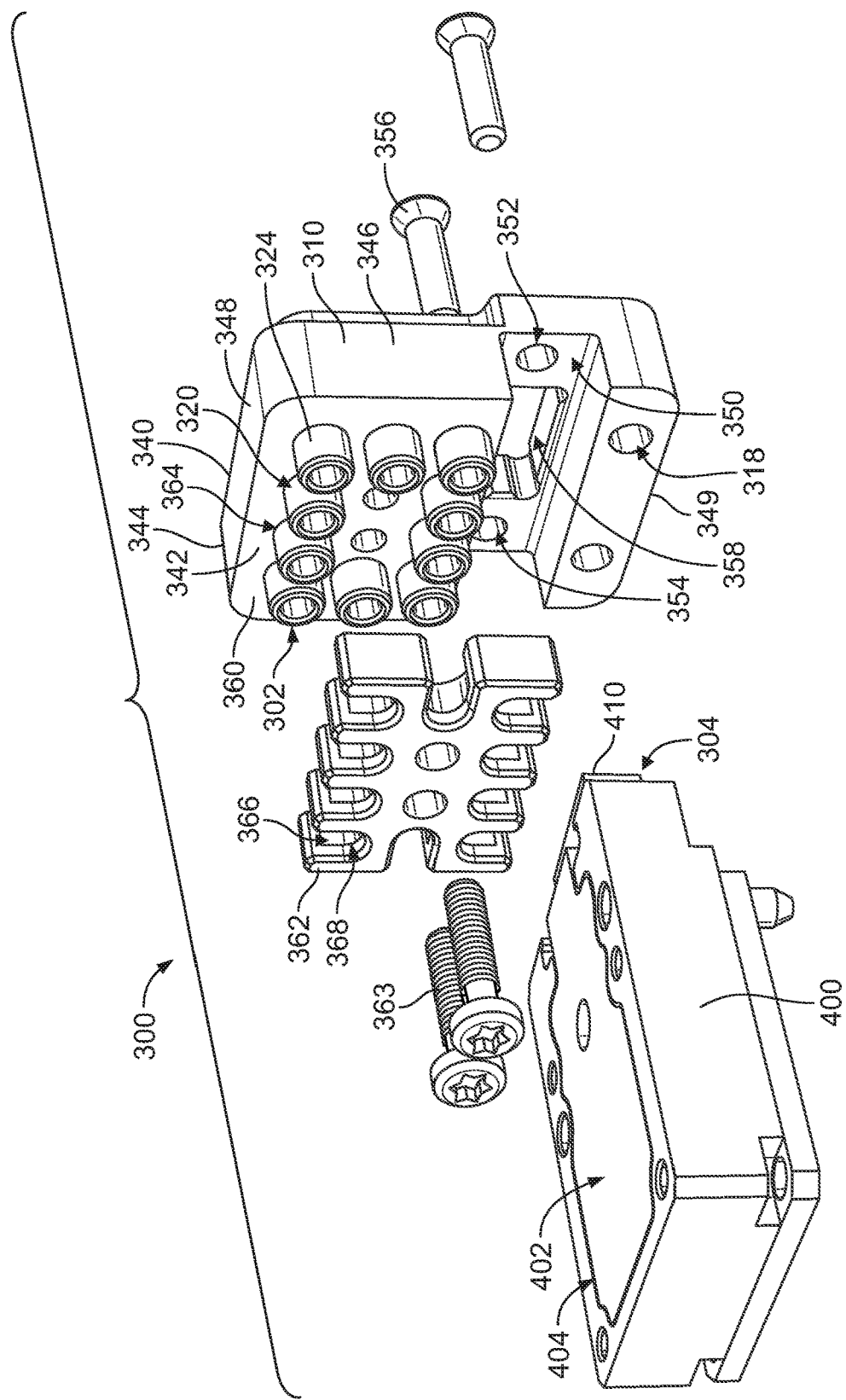
FIG. 6 is a rear exploded view of the connector assembly showing the coaxial connector module and the fiber optic module.
Figure 7:
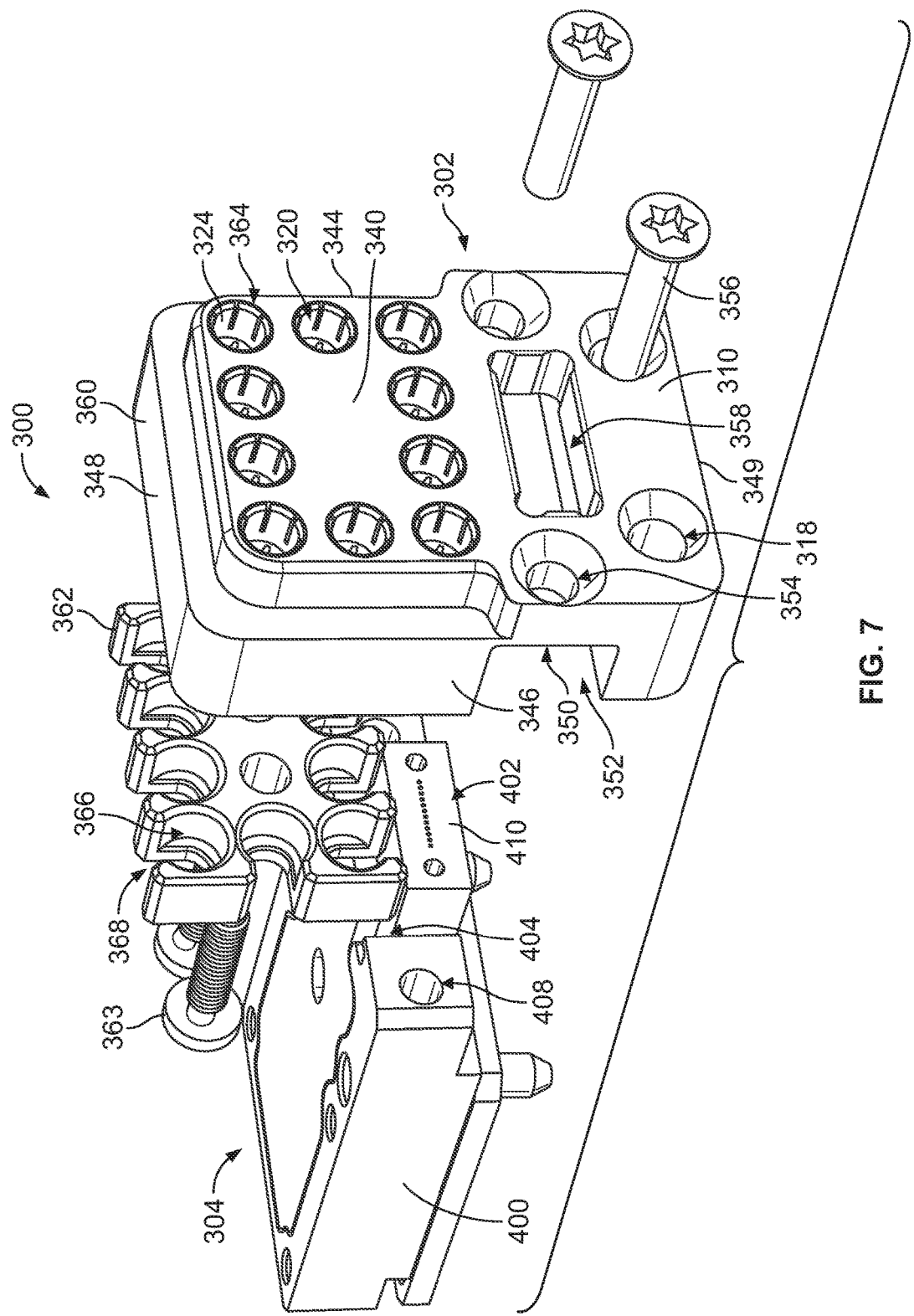
FIG. 7 is a front exploded view of the connector assembly showing the coaxial connector module and the fiber optic module.
Figure 8:
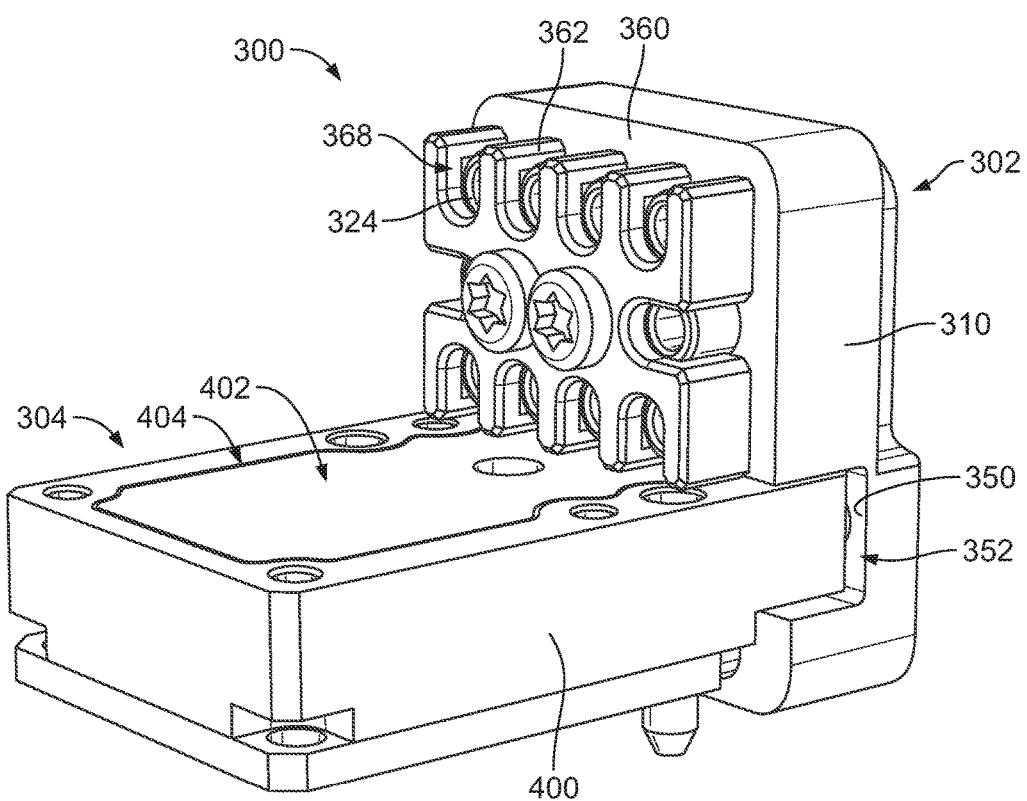
FIG. 8 is a rear perspective view of the connector assembly in an assembled state showing the coaxial connector module and the fiber optic module.
Figure 9:
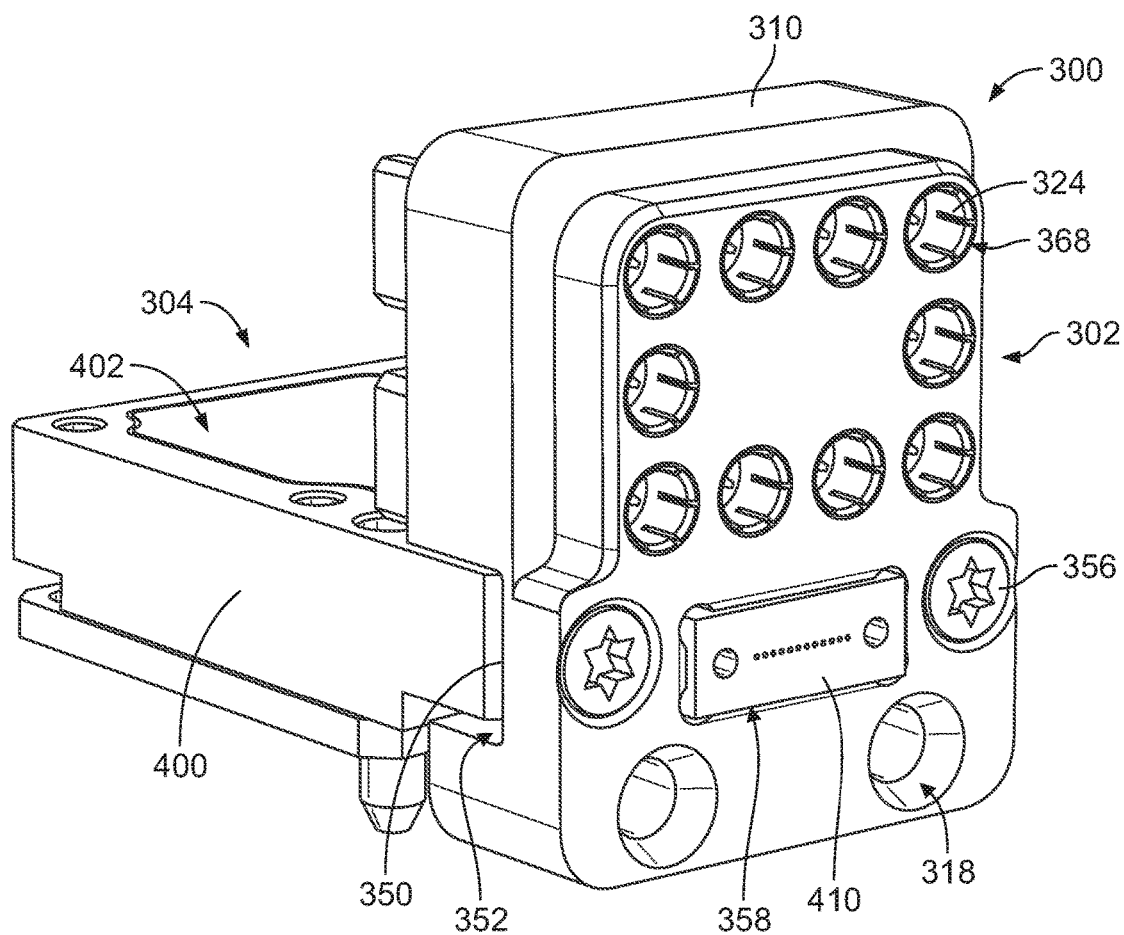
FIG. 9 is a front perspective view of the connector assembly in an assembled state showing the coaxial connector module and the fiber optic module.

FIG. 6 is a rear exploded view of the connector assembly 300 showing the coaxial connector module 302 and the fiber optic module 304. FIG. 7 is a front exploded view of the connector assembly 300 showing the coaxial connector module 302 and the fiber optic module 304. FIG. 8 is a rear perspective view of the connector assembly 300 in an assembled state showing the coaxial connector module 302 and the fiber optic module 304. FIG. 9 is a front perspective view of the connector assembly 300 in an assembled state showing the coaxial connector module 302 and the fiber optic module 304.

The coaxial connector module 302 includes the connector body 310 holding the coaxial cable assemblies 320. In an exemplary embodiment, the connector body 310 includes a forward section 360 and a rear section 362. The forward and rear sections 360, 362 are discrete elements that are configured to be secured to each other. In the illustrated embodiment, the forward and rear sections 360, 362 are secured to each other using hardware 363 (e.g., screws), but may be secured to each other in other manners in alternative embodiments. In various embodiments, the hardware 343 are captive screws configured to be held in the rear section 362, such as to make assembly easier and/or to prevent losing the hardware 343 during assembly. The forward section 360 includes a plurality of contact cavities 364 and the rear section 362 includes a plurality of contact cavities 366. When the forward and rear sections 360, 362 are coupled to each other, the contact cavities 364, 366 align with each other to form contact channels 368. Each of the contact channels 368 is configured to receive a portion of a corresponding coaxial cable assembly 320 and, in particular, a corresponding coaxial contact 324.

The connector body 310 has the mating interface 350, which in the illustrated embodiment includes the pocket 352. The pocket 352 receives the housing 400 of the fiber optic module 304. For example, the front end of the housing 400 may be nested in the pocket 352 of the connector body 310. In an exemplary embodiment, the front end of the housing 400 includes fastener openings 408 that are configured to be aligned with the fastener openings 354 of the connector body 310 to receive the fasteners 356. The fasteners 356 secure the housing 400 of the fiber optic module 304 to the connector body 310. When the fiber optic module 304 is coupled to the connector body 126, the fiber optic connector 402 is aligned with and at least partially received in the window 358. The connector body 310 encases the window 358 such that the connector body 310 extends entirely around the fiber optic connector 402.

The fiber optic connector 402 is received in the cavity 404 of the housing 400. The housing 400 is securely coupled to the connector body 310 at the mating interface 350 and is configured to be securely coupled to the substrate 306. In an exemplary embodiment, the fiber optic connector 402 includes a ferrule 410 at the mating end of the fiber optic connector 402. The ferrule 410 may hold fibers for transmitting light. In the illustrated embodiment, the fiber optic module 304 is configured to be terminated to the substrate 306. For example, the fiber optic module 304 may include a digital to optical converter or other componentry for connection to the substrate 306. In alternative embodiments, rather than being terminated to the substrate 306, a fiber optic cable (not shown) may extend from the fiber optic connector 402.

The connector assembly 300 includes the RF connector interface defined by the coaxial contacts 324 and the fiber optic connector interface defined by the fiber optic connector 402. Both interfaces are presented within the same connector assembly 300. For example, the mating end of the fiber optic connector 402 is located immediately adjacent the array of coaxial contacts 324. The mating ends of the coaxial contacts 324 and the mating end of the fiber optic connector 402 are presented at the front side 340 of the connector body 310.

The alignment features 318 are provided at the front side 340 of the connector body 310 for receiving the alignment posts. Other types of guide features may be provided in alternative embodiments. In the illustrated embodiment, the window 358 and the fiber optic connector 402 are located between the alignment features 318 and the coaxial contacts 324. Other arrangements are possible in alternative embodiments.

In an exemplary embodiment, the connector body 310 has a perimeter defined by the ends 348, 349 and the sides 344, 346. The coaxial contacts 324 are arranged in an array within the perimeter of the connector body 310. The window 358 is contained within the perimeter such that the ferrule 410 of the fiber optic connector 402 is contained within the perimeter. The window 358 is encased by the connector body 310 such that the connector body 310 extends entirely around the ferrule 410 of the fiber optic connector 402.

Figure 10:
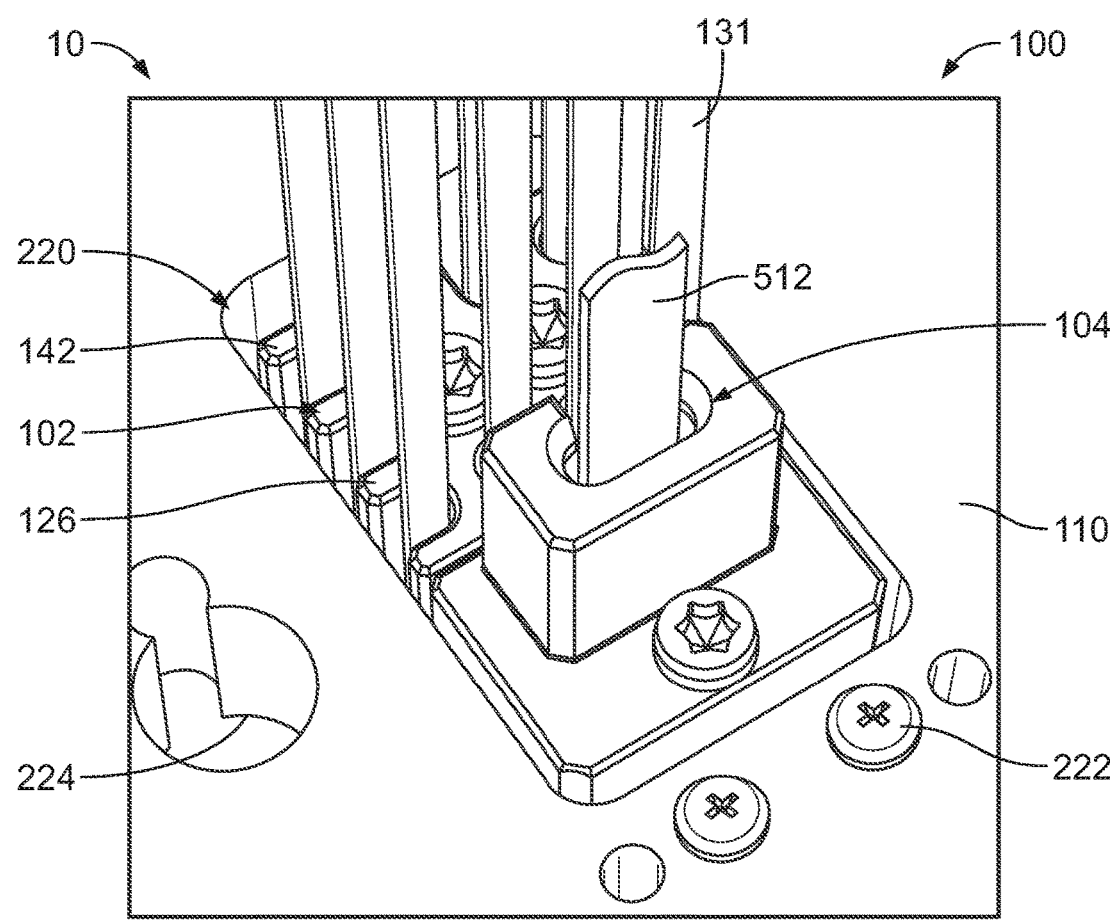
FIG. 10 is a rear perspective view of a portion of the communication system showing the connector assembly coupled to a support wall.

FIG. 10 is a rear perspective view of a portion of the communication system 10 showing the connector assembly 100 coupled to the support wall 110. The support wall 110 includes an opening 220. The connector assembly 100 is coupled to the support wall 110 at the opening 220. The mounting frame 106 is securely coupled to the support wall 110 using fasteners 222 or other means. The mounting side 108 abuts against a front surface 224 of the support wall 110. The mounting frame 106 supports the coaxial connector module 102 and the fiber optic module 104 independent of the support wall 110. For example, the backing plate 200 holds the connector body 126 in the mounting frame 106 such that no portion of the connector body 126 engages the support wall 110. The opening 220 may be oversized relative to the coaxial connector module 102. The coaxial connector module 102 and the fiber optic module 104 held by the connector body 126 has a limited amount of floating movement relative to the support wall 110. In an exemplary embodiment, portions of the coaxial connector module 102 and the fiber optic module 104 extend into and/or through the opening 220. For example, the rear section 142 may extend into and/or through the opening 220. The coaxial cables 131 extend through the opening 220 and extend from the support wall 110, such as to another component. The fiber optic cable 512 extends through the opening 220 and extends from the support wall 110, such as to another component.

Figure 11:
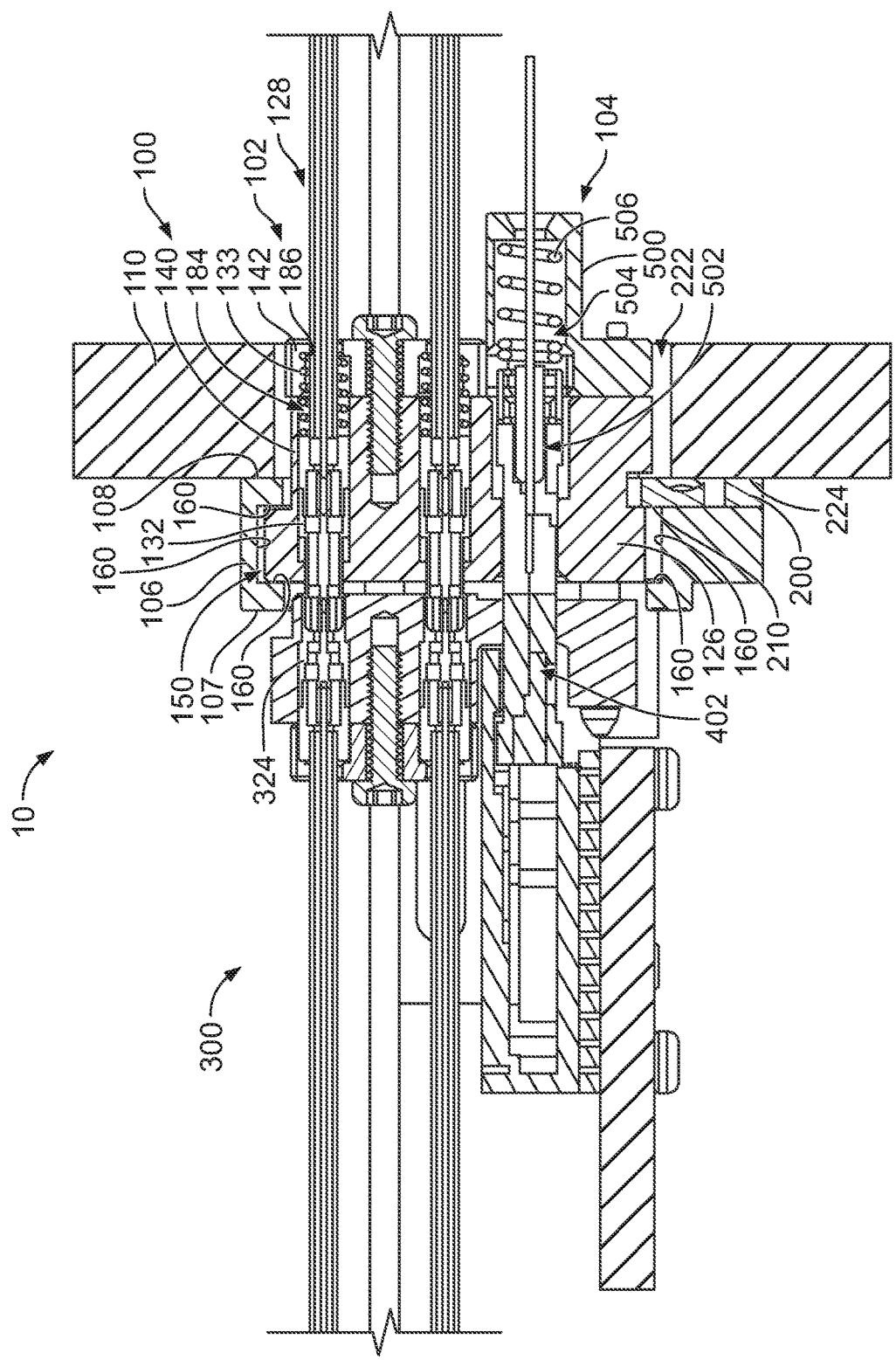
FIG. 11 is a cross-sectional view of the communication system showing the connector assembly mated with the connector assembly.

FIG. 11 is a cross-sectional view of the communication system 10 showing the connector assembly 100 mated with the connector assembly 300 at the mating side 107. The connector assembly 100 is mounted to the support wall 110 at the mounting side 108. The rear portion of the front section 140 and the rear section 142 extend into the opening 220 of the support wall 110. The mounting frame 106 rests on the front surface 224 of the support wall 110. In an exemplary embodiment, the backing plate 200 holds the connector body 126 in the recess 150 such that the connector body 126 is supported by the mounting frame 106 and the backing plate 200 independent of the support wall 110. However, in alternative embodiments, rather than using the backing plate and the rear rim of the mounting frame 106 to support the connector body 126, the recess 150 may be open at the mounting end 114 and the support wall 110 may be used to hold the connector body 126 in the recess 150 at the mounting end 114. The connector body 126 supports the fiber optic module 104.

In an exemplary embodiment, the coaxial connector module 102 has a limited amount of floating movement relative to the mounting frame 106. For example, the recess 150 is oversized relative to the connector body 126. For example, gaps are provided between the connector body 126 and the mounting frame 106. The connector body 126 is able to shift laterally in the recess 150. The mounting frame 106 and the backing plate 200 form a confined space for the connector body 126 to generally hold the connector body 126 and the fiber optic module 104 while allowing the floating movement within the confined space, such as in one or more directions. The blocking surfaces 160, 210 define the confined space. The confined space represents the limited space in which the portion of the coaxial connector module 102 is permitted to move relative to the support wall 110 or the mounting frame 106.

The coaxial cable assemblies 128 include the biasing springs 133 coupled to the connector body 126 to allow floating movement of the coaxial contacts 132 in the contact channels 184. The biasing springs 133 engage the coaxial contacts 132 and engage the ledges 186 at the rear of the rear section 142. When the connector assembly 100 is mated with the connector assembly 300, the coaxial contacts 132 are pushed rearward to compress the biasing springs 133. The biasing springs 133 allow the coaxial contacts 132 to move axially rearward and provide a biasing force for mating the coaxial contacts 132 with the mating contacts 324 of the connector assembly 300. The biasing force facilitates maintaining a sufficient electrical connection between the coaxial contacts 132 and the coaxial contacts 324. For example, in some environments, the communication system 10 may experience shock, vibration, and/or extreme temperatures that may cause deformation, movement, and/or creepage among different elements. The biasing force may lengthen or improve the lifetime operability of the communication system 10.

The fiber optic module 104 includes the biasing spring 506 coupled to the housing 500 to allow floating movement of the fiber optic connector 502 in the cavity 504. The biasing spring 506 engages the fiber optic connector 502 and engages the housing 500 at the rear of the cavity 504. When the connector assembly 100 is mated with the connector assembly 300, the fiber optic connector 502 is pushed rearward to compress the biasing spring 506. The biasing spring 506 allows the fiber optic connector 502 to move axially rearward and provide a biasing force for mating the fiber optic connector 502 with the mating fiber optic connector 402 of the connector assembly 300.

Figure 12:
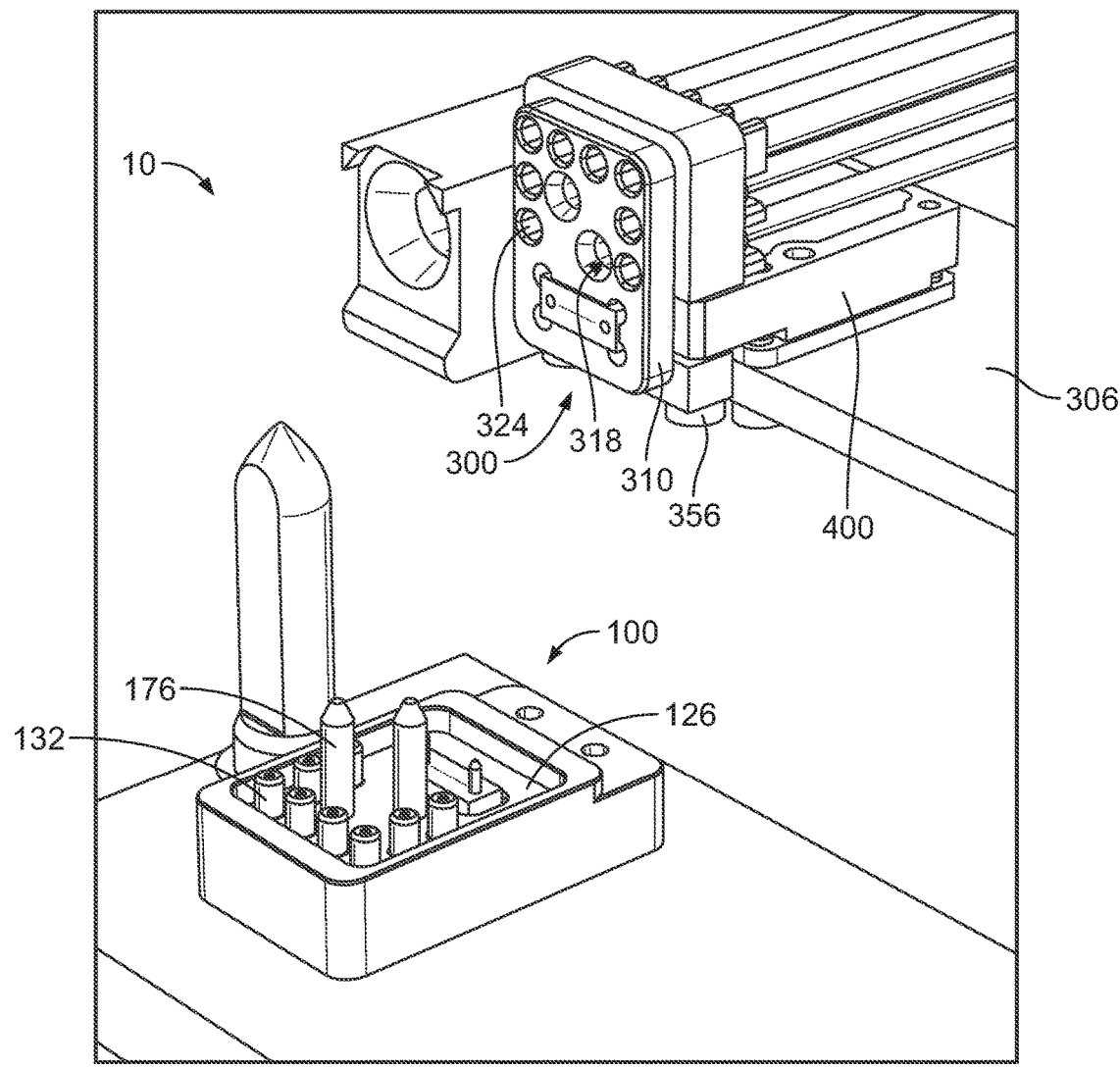
FIG. 12 is a perspective view of the communication system formed in accordance with an exemplary embodiment, showing the connector assembly and the connector assembly in an unmated state.

FIG. 12 is a perspective view of the communication system 10 formed in accordance with an exemplary embodiment, showing the connector assembly 100 and the connector assembly 300 in an unmated state. FIG. 12 shows a different arrangement of the alignment posts 176 and the alignment features 318, showing the alignment posts 176 and the alignment features 318 more centrally located, such as within the array of the coaxial contacts 132 and 324. The connector bodies 126, 310 may be shorter by moving the alignment posts 176 and the alignment features 318. FIG. 12 shows a different arrangement for connecting the connector body 310 to the housing 400. For example, the fasteners 356 are coupled to the bottom of the connector body 310 rather than the front of the connector body 310. The fastener 356 are fastened in a direction perpendicular to the substrate 306 rather than parallel to the substrate 306.

Figure 13:
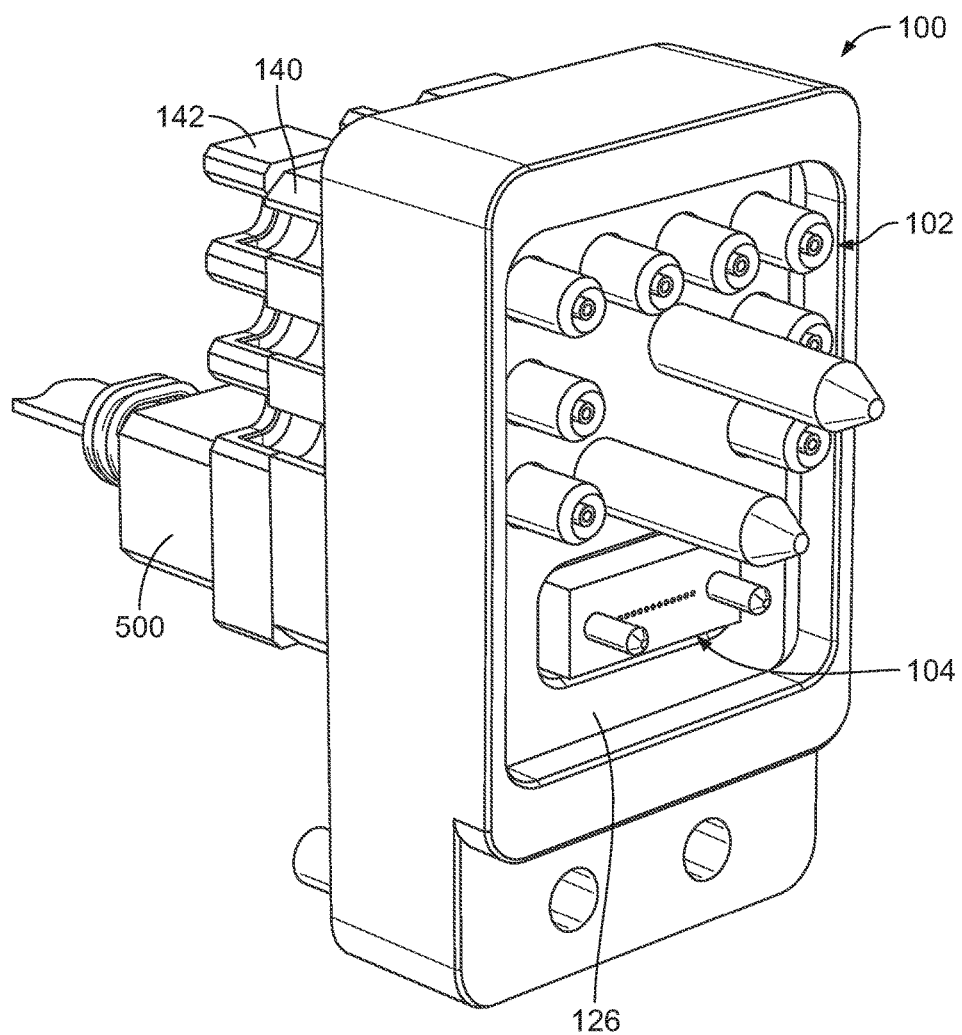
FIG. 13 is a front perspective view of the connector assembly in an assembled state showing the coaxial connector module and the fiber optic module.
Figure 14:
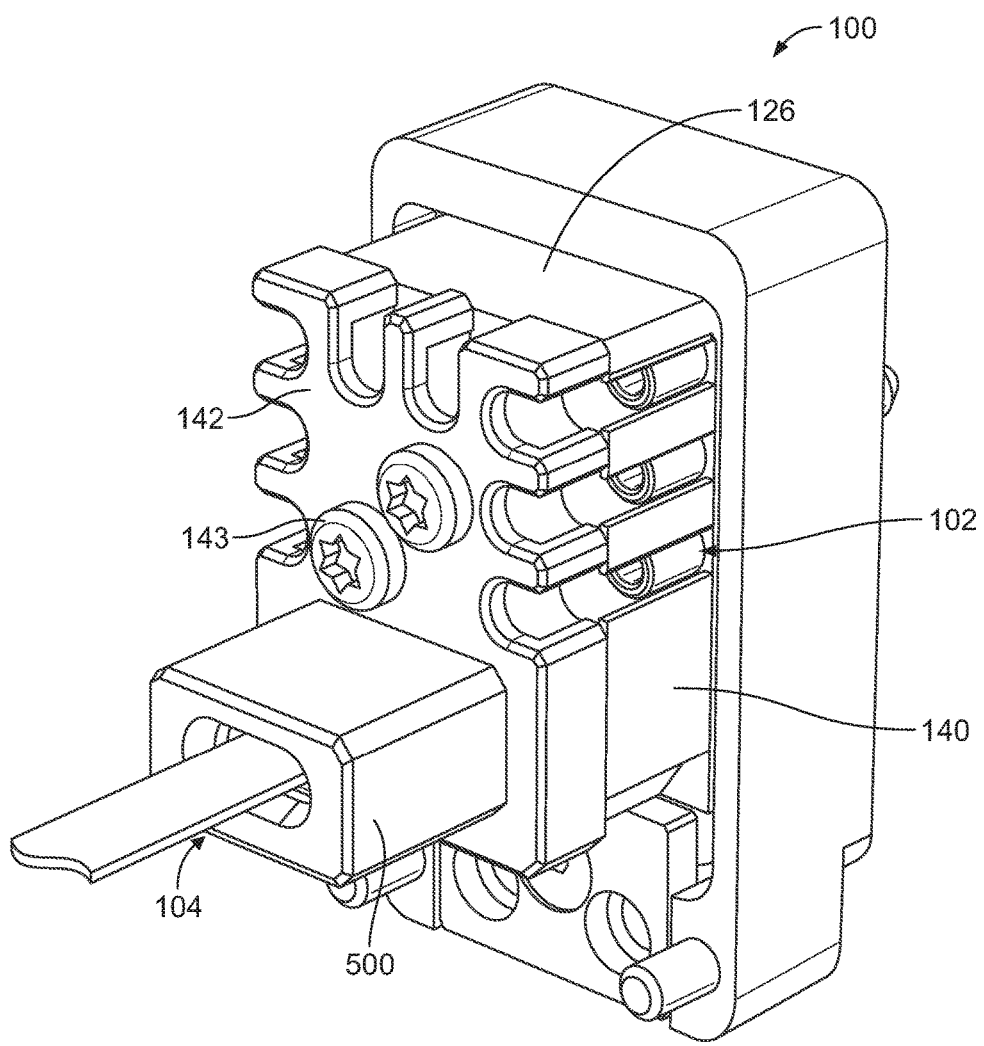
FIG. 14 is a rear perspective view of the connector assembly in an assembled state showing the coaxial connector module and the fiber optic module.
Figure 15:
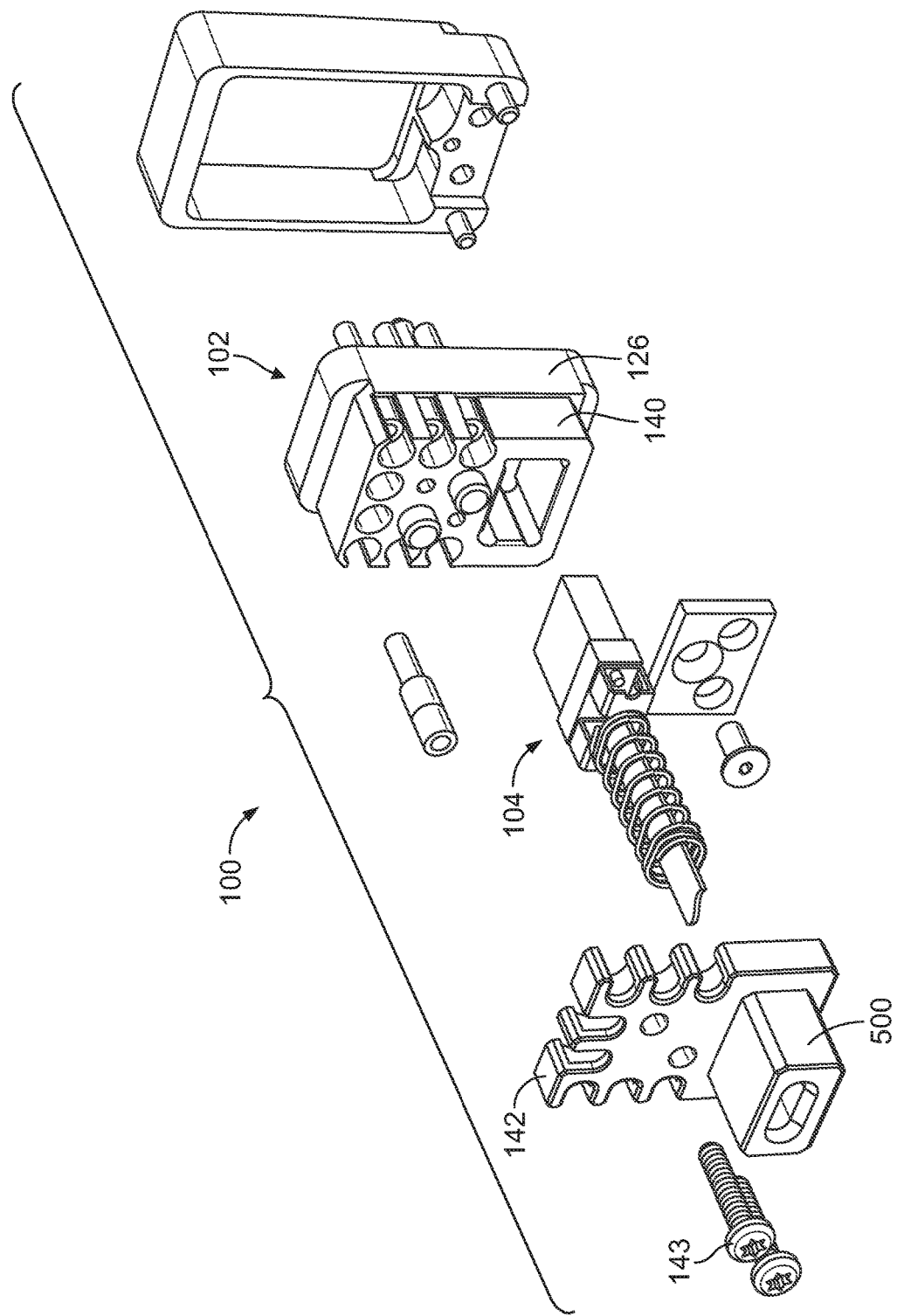
FIG. 15 is a rear exploded view of the connector assembly showing the coaxial connector module and the fiber optic module.

FIG. 13 is a front perspective view of the connector assembly 100 in an assembled state showing the coaxial connector module 102 and the fiber optic module 104 from the embodiment shown in FIG. 12. FIG. 14 is a rear perspective view of the connector assembly 100 in an assembled state showing the coaxial connector module 102 and the fiber optic module 104 from the embodiment shown in FIG. 12. FIG. 15 is a rear exploded view of the connector assembly 100 showing the coaxial connector module 102 and the fiber optic module 104 from the embodiment shown in FIG. 12.

In the illustrated embodiment, the rear section 142 of the connector body 126 is formed integral with the housing 500. The housing 500 is mounted to the front section 140 of the connector body 126 with the rear section 142 using the fasteners 143. In alternative embodiments, the housing 500 may be separate and discrete from the rear section 142.

Figure 16:
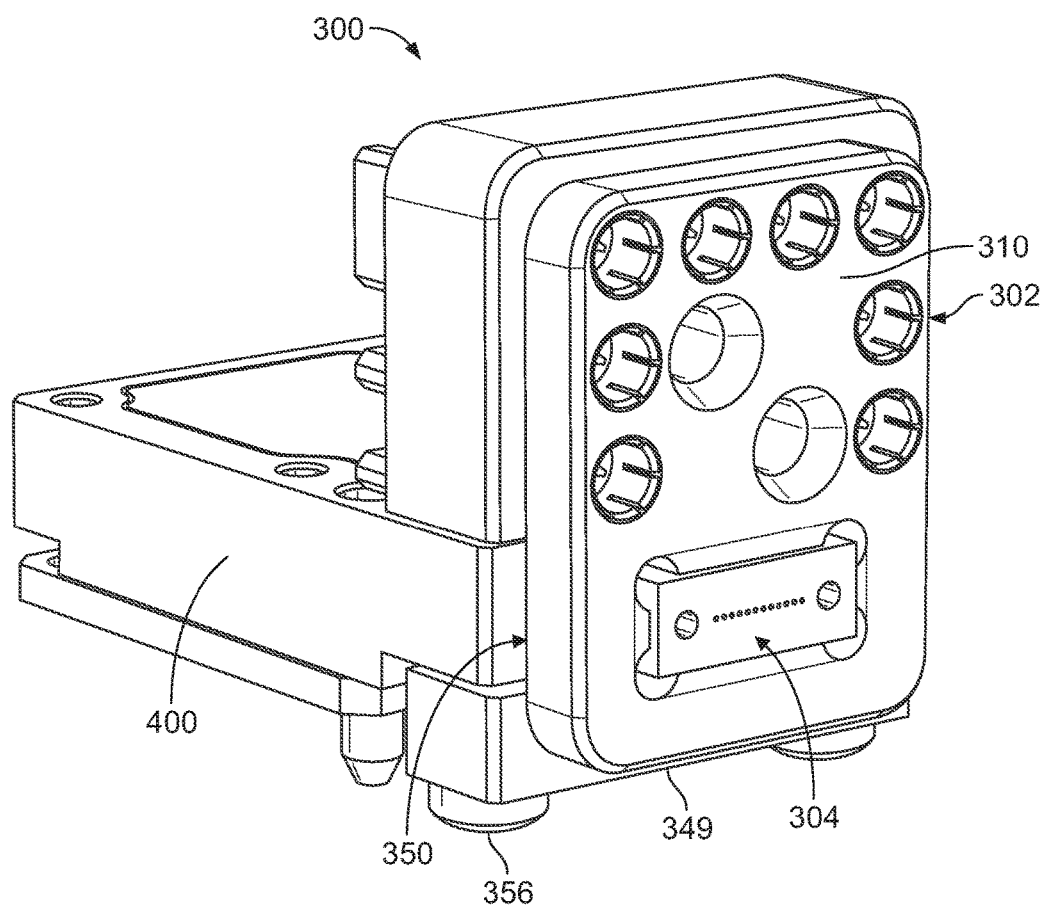
FIG. 16 is a front perspective view of the connector assembly in an assembled state showing the coaxial connector module and the fiber optic module.
Figure 17:
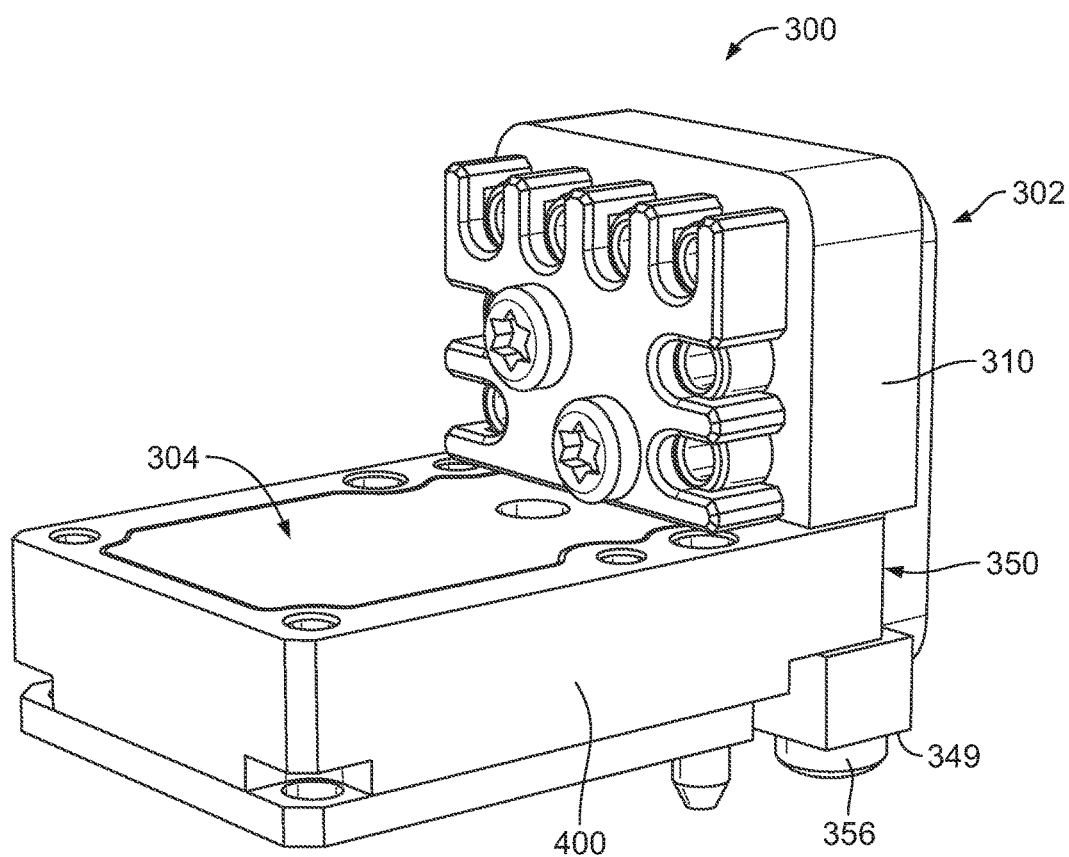
FIG. 17 is a rear perspective view of the connector assembly in an assembled state showing the coaxial connector module and the fiber optic module.
Figure 18:
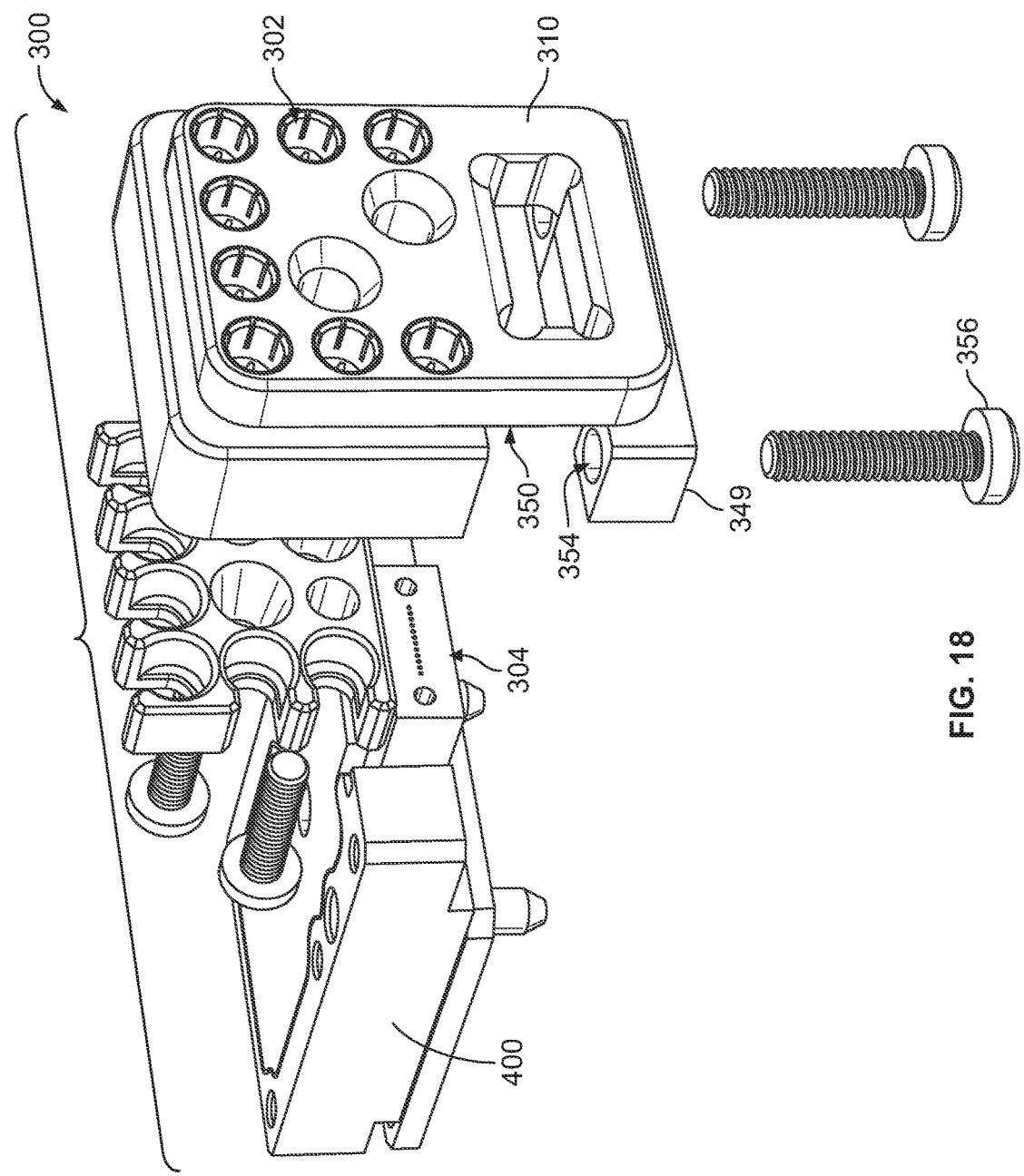
FIG. 18 is a front exploded view of the connector assembly showing the coaxial connector module.
Figure 19:
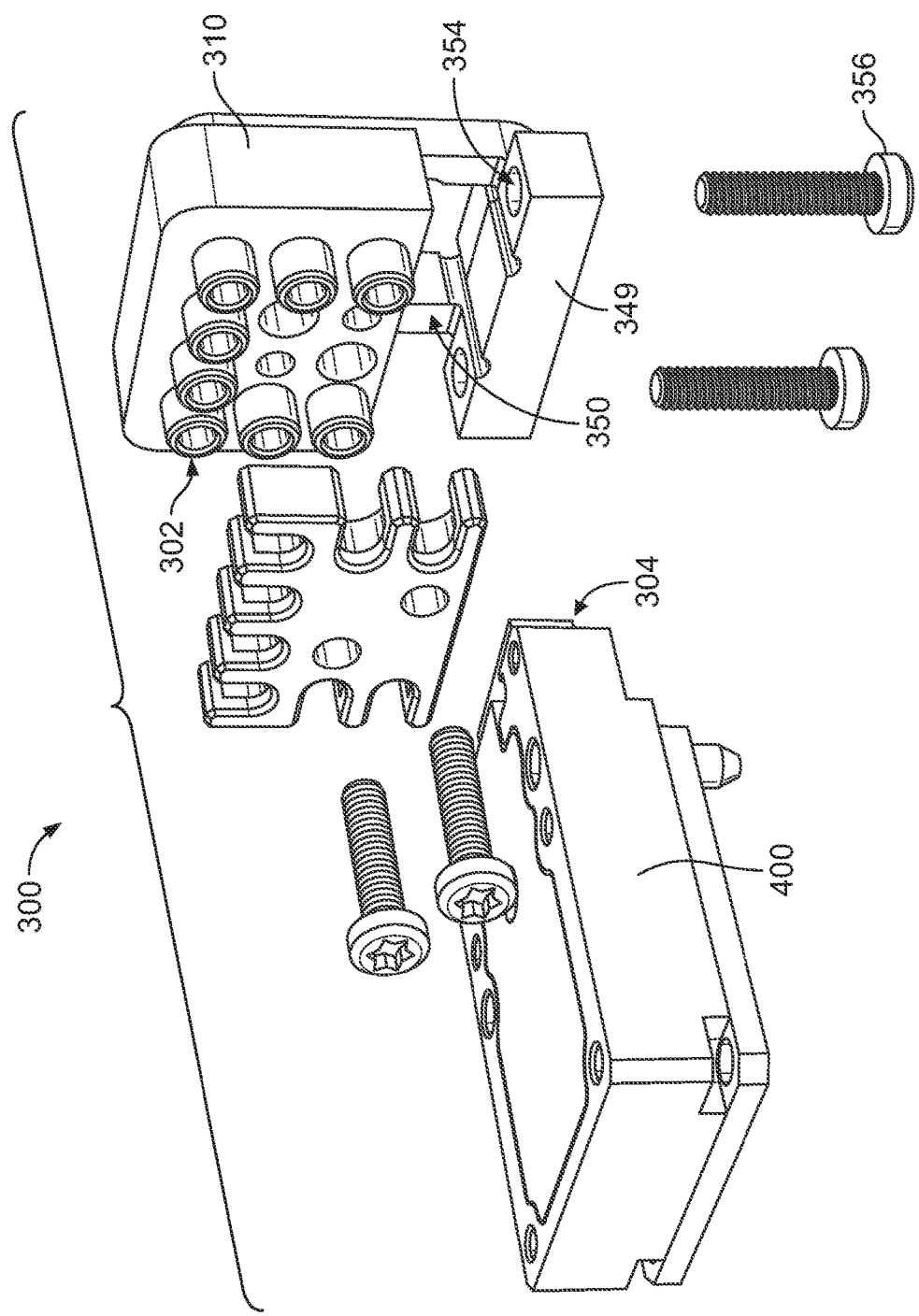
FIG. 19 is a rear exploded view of the connector assembly showing the coaxial connector module and the fiber optic module.

FIG. 16 is a front perspective view of the connector assembly 300 in an assembled state showing the coaxial connector module 302 and the fiber optic module 304 from the embodiment shown in FIG. 12. FIG. 17 is a rear perspective view of the connector assembly 300 in an assembled state showing the coaxial connector module 302 and the fiber optic module 304 from the embodiment shown in FIG. 12. FIG. 18 is a front exploded view of the connector assembly 300 showing the coaxial connector module 302 and the fiber optic module 304 from the embodiment shown in FIG. 12. FIG. 19 is a rear exploded view of the connector assembly 300 showing the coaxial connector module 302 and the fiber optic module 304 from the embodiment shown in FIG. 12.

In an exemplary embodiment, the fastener openings 354 in the connector body 310 are open to the mating interface 350 to receive the fasteners 356 to secure the fiber optic module 304 to the connector body 310. In the illustrated embodiment, the fastener openings 354 are open at the second end 349. The fasteners 356 are secured to the bottom of the housing 400 rather than the front of the housing 400.

Figure 20:
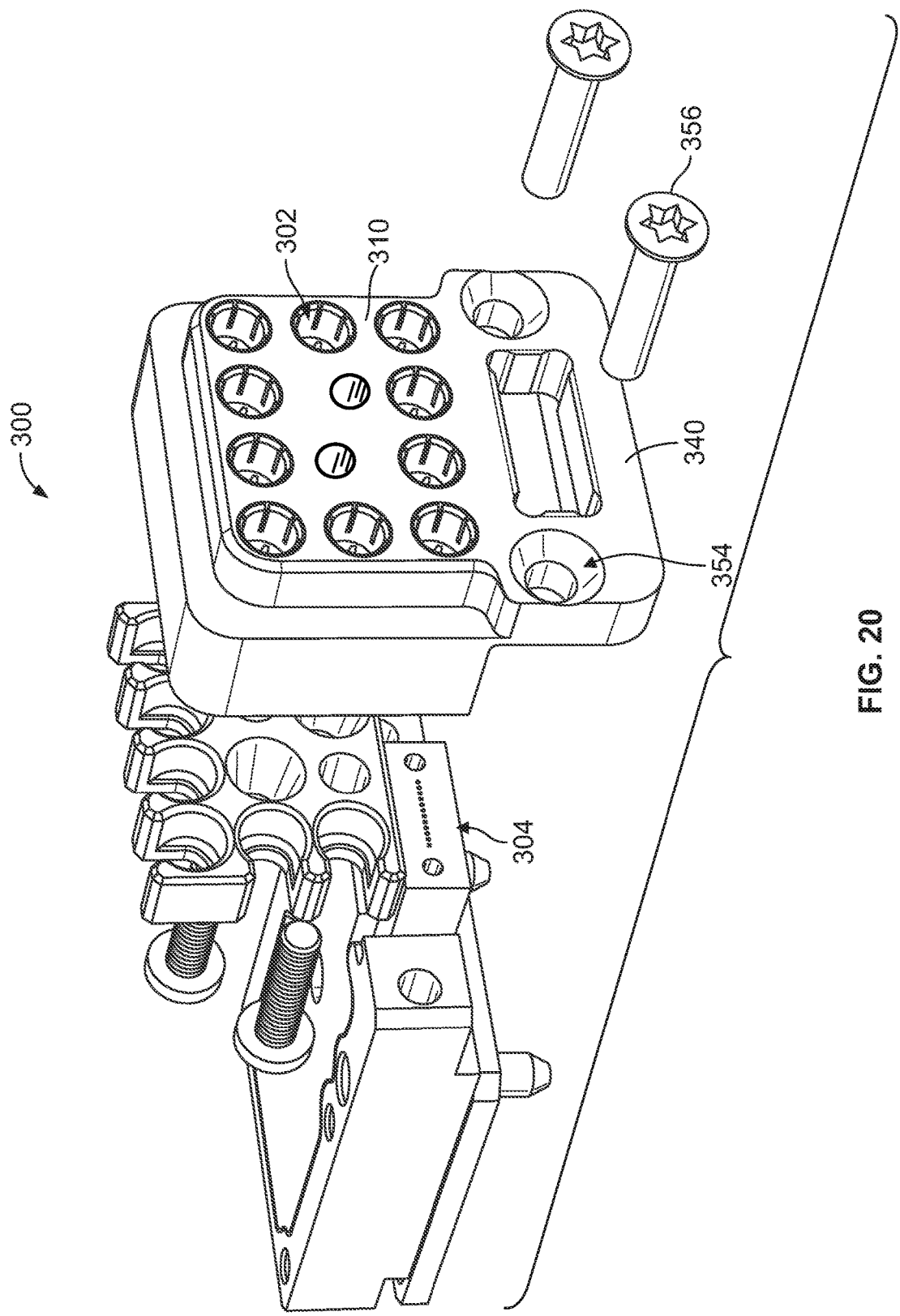
FIG. 20 is a front exploded view of the connector assembly showing the coaxial connector module and the fiber optic module.

FIG. 20 is a front exploded view of the connector assembly 300 showing the coaxial connector module 302 and the fiber optic module 304 similar to the embodiment shown in FIG. 18. FIG. 20 shows the fastener openings 354 at the front side 340 of the connector body 310 to receive the fasteners 356 from the front rather than from the bottom.

Figure 21:
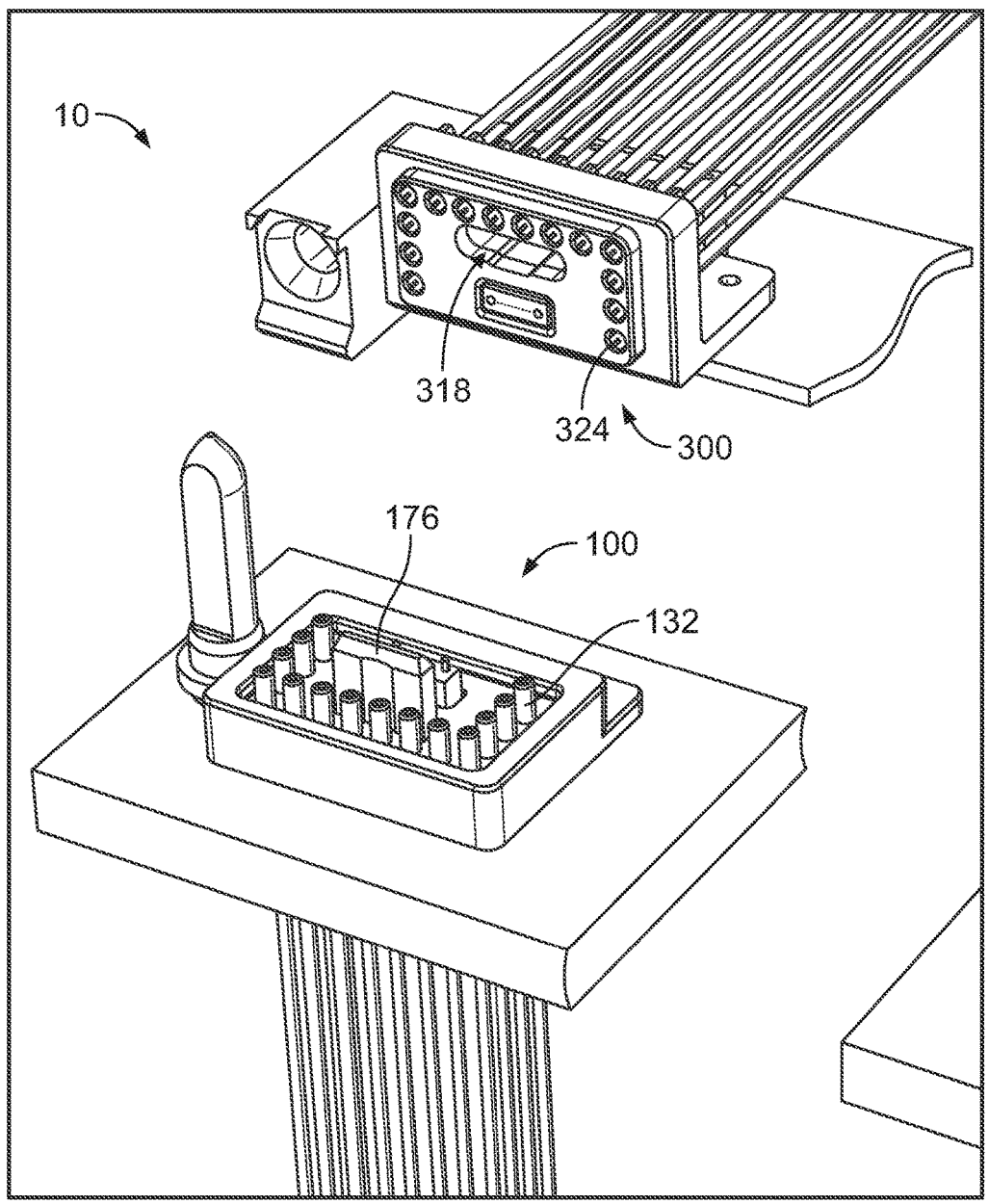
FIG. 21 is a perspective view of the communication system formed in accordance with an exemplary embodiment showing the connector assembly and the connector assembly in an unmated state.

FIG. 21 is a perspective view of the communication system 10 formed in accordance with an exemplary embodiment, showing the connector assembly 100 and the connector assembly 300 in an unmated state. FIG. 21 shows a different type of alignment post 176 and alignment feature 318, showing the alignment post 176 as an elongated tab rather than a pair of posts. The alignment post 176 and the alignment features 318 are centrally located within the array of the coaxial contacts 132 and 324. The connector assemblies 100, 300 include a greater number of coaxial contacts 132, 324 and the connector assemblies 100, 300 have a larger mating interface as compared to the embodiments shown in FIGS. 1 and 12.

Figure 22:
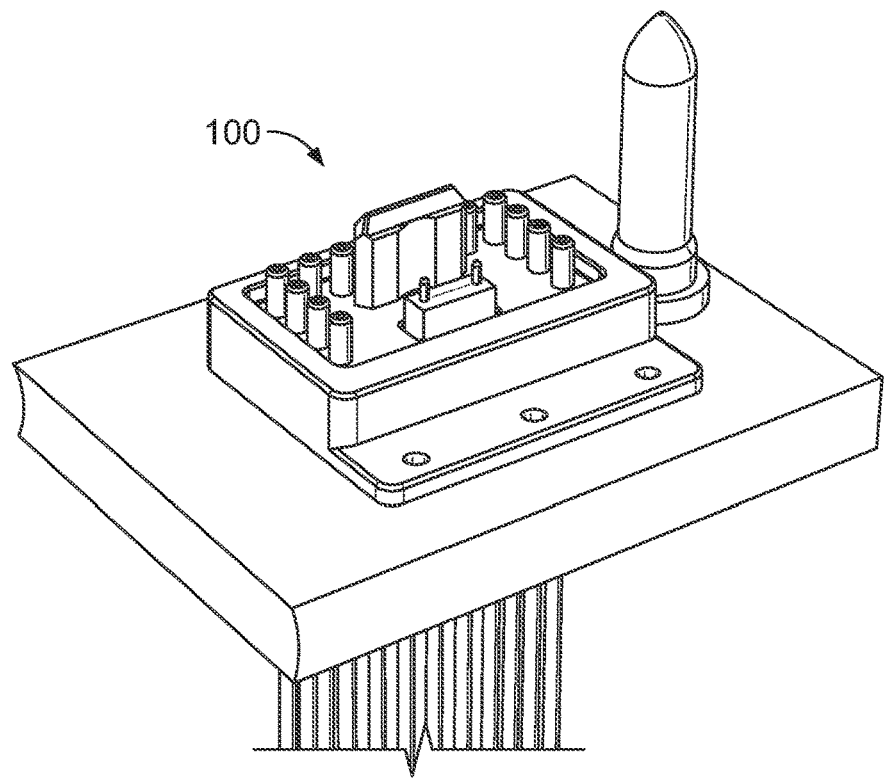
FIG. 22 is a front perspective view of the connector assembly in accordance with an exemplary embodiment.

FIG. 22 is a front perspective view of the connector assembly 100 in accordance with an exemplary embodiment.

Figure 23:
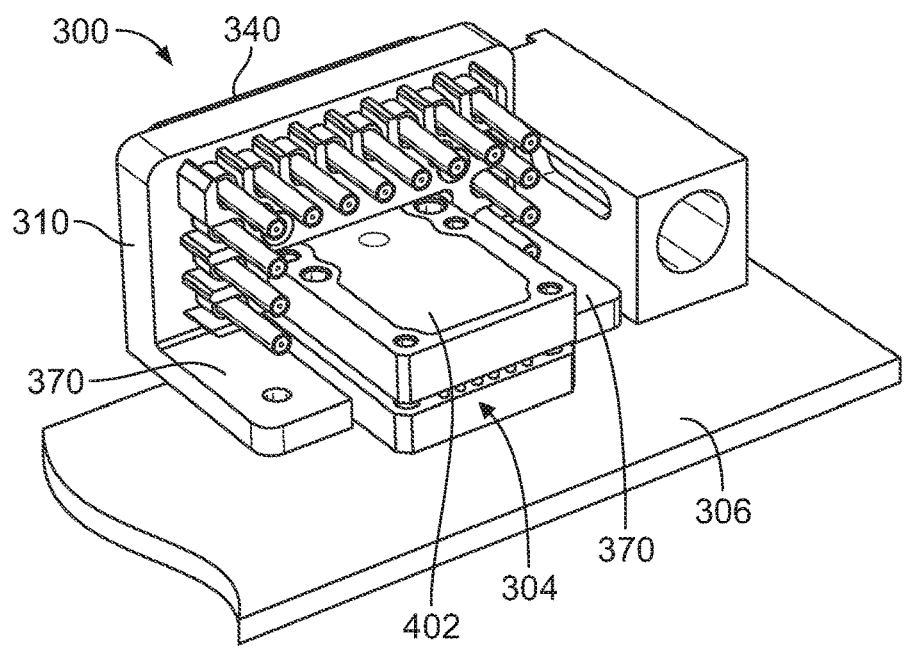
FIG. 23 is a rear perspective view of the connector assembly in accordance with an exemplary embodiment.

FIG. 23 is a rear perspective view of the connector assembly 300 in accordance with an exemplary embodiment. In the illustrated embodiment, the connector body 310 includes mounting beams 370 at the rear side of the connector body 310 for mounting the connector body 310 to the substrate 306. The connector body 310 is configured to be separately mounted to the substrate 306 over the fiber optic module 304. The mating end of the fiber optic module 304 is loaded into the connector body 310, such as into the pocket of the connector body 310 such that the ferrule 410 of the fiber optic connector 402 extends through the window 358 at the front side 340 of the connector body 310. The fiber optic module 304 separately mounted to the substrate 306. Optionally, the fiber optic module 304 may be mounted to the substrate 306 prior to the connector body 310. The connector body 310 may be placed over and around the fiber optic module 304 such that the mating end of the fiber optic connector 402 extends through the window 358 for mating with the connector assembly 100.

FIG. 24 is an exploded view of the connector assembly 300 in accordance with an exemplary embodiment. FIG. 24 shows the fiber optic module 304 including a housing 600 holding a fiber optic connector 602 provided at an end of a fiber optic cable 612, rather than utilizing the board mounted housing 400 and fiber optic connector 402 shown in FIG. 1.

The housing 600 is configured to be coupled to the connector body 310. The housing 600 includes a cavity 604 receiving the fiber optic connector 602. The fiber optic module 304 is arranged for coupling with the fiber optic connector 502 of the coaxial connector module 302 (shown in FIG. 1). In an exemplary embodiment, the fiber optic module 304 includes a biasing spring 606 configured to be coupled between the housing 600 and the fiber optic connector 602 to allow floating movement of the fiber optic connector 602 in the cavity 604.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112(f), unless and until such claim limitations expressly use the phrase "means for" followed by a statement of function void of further structure.

What is claimed is:

1. A connector assembly comprising:
    a coaxial connector module having a connector body and coaxial contacts, the connector body extending between a front side and a rear side, the connector body having contact channels therethrough holding corresponding coaxial contacts for engaging corresponding mating coaxial contacts of a mating connector assembly, each coaxial contact including an inner conductor and an outer conductor coaxial with the inner conductor, the front side facing in a mating direction along a mating axis, the connector body having a mating interface and fastener openings open at the mating interface to receive fasteners, the connector body having a window at the mating interface, the connector body holding biasing springs in the contact channels engaging the corresponding coaxial contacts to allow axial compression of the coaxial contacts when mated with the mating coaxial contacts; and
    a fiber optic module coupled to the coaxial connector module, the fiber optic module including a housing coupled to the mating interface of the connector body, the housing having a cavity, the housing having fastener openings aligned with the fastener openings in the connector body and receiving the fasteners to couple the housing to the connector body at the mating interface, the fiber optic module including a fiber optic connector received in the cavity of the housing, the fiber optic connector having a mating end and a fiber optic cable extending from the fiber optic connector, the fiber optic connector being received in the window for mating with a mating fiber optic connector of the mating connector assembly, the housing holding a biasing spring in the cavity engaging the fiber optic connector to allow axial compression of the fiber optic connector when mated with the mating fiber optic connector.

2. The connector assembly of claim 1, wherein the connector body includes a pocket defining the mating interface, the housing of the fiber optic module being received in the pocket.

3. The connector assembly of claim 1, wherein the fiber optic connector passes at least partially through the window of the connector body of the coaxial connector module.

4. The connector assembly of claim 1, wherein the connector body has a perimeter defined by a first end, a second end, a first side and a second side, the fiber optic module being contained within the perimeter.

5. The connector assembly of claim 1, wherein the coaxial connector module includes guide features configured to interface with complementary guide features of the mating connector assembly to guide mating there with, the window in the fiber optic connector being positioned between the guide features and the coaxial contacts.

6. The connector assembly of claim 1, wherein the fiber optic connector includes a ferrule at the mating end, the ferrule being positioned in the window of the connector body of the coaxial connector module.

7. The connector assembly of claim 1, wherein the window is encased by the connector body such that the connector body extends entirely around the fiber optic connector.

8. The connector assembly of claim 1, further comprising a mounting frame having a recess receiving the connector body, the mounting frame having a mounting side mounted to a support wall at an opening in the support wall, the connector body at least partially received in the opening.

9. The connector assembly of claim 8, wherein the recess is oversized relative to the connector body to allow a limited amount of floating movement of the connector body in the recess within a confined space defined by blocking surfaces of the mounting frame to allow relative movement between the connector body and the support wall.

10. The connector assembly of claim 8, wherein the coaxial contacts are terminated to coaxial cables, the coaxial cables and the fiber optic cable passing through the opening in the support wall.

11. The connector assembly of claim 1, wherein the housing of the fiber optic module includes a mounting side mounted to a circuit board.

12. The connector assembly of claim 11, wherein the coaxial connector module is secured to the circuit board by the housing.

13. The connector assembly of claim 11, wherein the connector body includes mounting beams mounted to the circuit board independent of the housing.

14. A connector assembly comprising:
    a coaxial connector module having a connector body and coaxial contacts, the connector body extending between a front side and a rear side, the connector body having contact channels therethrough holding corresponding coaxial contacts for engaging corresponding mating coaxial contacts of a mating connector assembly, each coaxial contact including an inner conductor and an outer conductor coaxial with the inner conductor, the front side facing in a mating direction along a mating axis, the connector body having a mating interface and fastener openings at the mating interface to receive fasteners, the connector body having a window at the mating interface, the connector body holding biasing springs in the contact channels engaging the corresponding coaxial contacts to allow axial compression of the coaxial contacts when mated with the mating coaxial contacts;
    a fiber optic module coupled to the coaxial connector module, the fiber optic module including a housing coupled to the mating interface of the connector body, the housing having a cavity, the housing having fastener openings aligned with the fastener openings in the connector body and receiving the fasteners to couple the housing to the connector body at the mating interface, the fiber optic module including a fiber optic connector received in the cavity of the housing, the fiber optic connector having a mating end and a fiber optic cable extending from the fiber optic connector, the fiber optic connector being received in the window for mating with a mating fiber optic connector of the mating connector assembly, the housing holding a biasing spring in the cavity engaging the fiber optic connector to allow axial compression of the fiber optic connector when mated with the mating fiber optic connector; and a mounting frame having a mating side and a mounting side that face in opposite directions, the mounting side facing in a mounting direction along the mating axis and configured to interface with a support wall, the mounting frame defining a passage therethrough having a recess that receives the connector body, the mounting frame having a plate pocket at the mounting side open to the recess, the mounting frame having a backing plate removably received in the plate pocket, the backing plate being coupled to the mounting frame to at least partially block the recess at the mounting side, wherein the mounting frame includes blocking surfaces and the backing plate includes a blocking surface, the blocking surfaces of the mounting frame and the blocking surface of the backing plate defining a confined space oversized relative to the connector body to allow a limited amount of floating movement of the connector body and the fiber optic module held by the connector body in the confined space in a lateral direction that is perpendicular to the mating axis.

15. The connector assembly of claim 14, wherein the connector body includes a pocket defining the mating interface, the housing of the fiber optic module being received in the pocket.

16. The connector assembly of claim 14, wherein the fiber optic connector passes through the window of the connector body of the coaxial connector module.

17. The connector assembly of claim 14, wherein the connector body has a perimeter defined by a first end, a second end, a first side and a second side, the fiber optic module being contained within the perimeter.

18. A communication system comprising:
a first connector assembly comprising a first coaxial connector module and a first fiber optic module coupled to the first coaxial connector module, the first coaxial connector module having a first connector body and first coaxial contacts held by the first connector body, each first coaxial contact including an inner conductor and an outer conductor coaxial with the inner conductor, the first connector body having a first mating interface and first fastener openings at the first mating interface to receive first fasteners, the first connector body having a first window open at the first mating interface, the first fiber optic module including a first housing coupled to the first mating interface of the first connector body and secured thereto by the first fasteners, the first housing having a first cavity receiving a first fiber optic connector having a mating end received in the window; and a second connector assembly comprising a second coaxial connector module and a second fiber optic module coupled to the second coaxial connector module, the second coaxial connector module having a second connector body and second coaxial contacts held by the second connector body, each second coaxial contact including an inner conductor mated with the inner conductor of the corresponding first coaxial contact and an outer conductor coaxial with the inner conductor mated with the outer conductor of the corresponding first coaxial contact, the second coaxial contacts having biasing springs coupled to the second connector body to allow floating movement when mated to the first coaxial contacts, the second connector body having a second mating interface and second fastener openings at the second mating interface receiving second fasteners, the second connector body having a second window at the second mating interface, the second fiber optic module including a second housing coupled to the second mating interface and secured thereto by the second fasteners, the second housing having a second cavity receiving a second fiber optic connector having a mating end received in the window the second fiber optic module having a biasing spring coupled to the second housing and the second fiber optic connector to allow floating movement of the second fiber optic connector when mated to the first fiber optic connector.

19. The communication system of claim 18, wherein the first connector assembly is mounted to a first circuit board and the second connector assembly is mounted to a second circuit board oriented perpendicular to the first circuit board.

* * * * *